United States Patent
Jarasius et al.

(10) Patent No.: US 10,592,472 B1
(45) Date of Patent: Mar. 17, 2020

(54) DATABASE SYSTEM FOR DYNAMIC AND AUTOMATED ACCESS AND STORAGE OF DATA ITEMS FROM MULTIPLE DATA SOURCES

(71) Applicant: Sterling Creek Holdings, Inc., Salt Lake City, UT (US)

(72) Inventors: Linas Bruno Jarasius, Austin, TX (US); Allen Philip Jost, Coronado, CA (US); S. David Sessions, Farmington, UT (US); Jeff Bank, Coto de Caza, CA (US); Mark Steven Barrios, Villa Park, CA (US)

(73) Assignee: Sterling Creek Holdings, Inc., Salt Lake City, UT (US)

( * ) Notice: Subject to any disclaimer, the term of this patent is extended or adjusted under 35 U.S.C. 154(b) by 439 days.

(21) Appl. No.: 15/594,907

(22) Filed: May 15, 2017

Related U.S. Application Data

(60) Provisional application No. 62/337,762, filed on May 17, 2016.

(51) Int. Cl.
*G06F 16/00* (2019.01)
*G06F 16/172* (2019.01)
*G06F 16/16* (2019.01)
*G06F 16/907* (2019.01)

(52) U.S. Cl.
CPC ......... *G06F 16/172* (2019.01); *G06F 16/164* (2019.01); *G06F 16/907* (2019.01)

(58) Field of Classification Search
CPC ....... H04L 67/22; G06F 16/33; G06F 16/172; G06F 16/97; G06F 16/164; G06Q 30/00; Y10S 707/00
See application file for complete search history.

(56) References Cited

U.S. PATENT DOCUMENTS

| | | | |
|---|---|---|---|
| 9,569,797 B1* | 2/2017 | Rohn | G06Q 40/025 |
| 2007/0022025 A1* | 1/2007 | Litman | G06Q 40/00 |
| | | | 705/30 |
| 2013/0103555 A1* | 4/2013 | Carter | G06Q 40/06 |
| | | | 705/30 |
| 2018/0114128 A1* | 4/2018 | Libert | G06Q 40/12 |

* cited by examiner

*Primary Examiner* — Taelor Kim
*Assistant Examiner* — Lahcen Ennaji
(74) *Attorney, Agent, or Firm* — Knobbe, Martens, Olson & Bear, LLP

(57) ABSTRACT

Embodiments of the present disclosure relate to a database system for dynamically and automatically accessing and storing data items from multiple data sources. The system may, for example, determine data sources to access, and ways of accessing data items from those data sources, based on an indication of an analysis level and/or other analysis criteria. Further, the system may selectively and efficiently integrate data items from the multiple data sources. Selective integration of data items may be based, for example, on the indication of the analysis level and/or other analysis criteria. The system may further generate outputs of the selective integration of data items. These outputs may, for example, include specialized reports and/or user interfaces. The outputs of the system, in some implementations, may be interactive and dynamically updated in response to user inputs, for example.

20 Claims, 15 Drawing Sheets

| 802 — Financial Performance Analysis | 804 Possible | 806 Original Score | 808 Weighted | 810 Updated Score | 812 Weighted | 814 Change |
|---|---|---|---|---|---|---|
| Reliable Financial Reports | 31 | 5 | 16 | 9 | 28 | ⇧13 |
| Metrics Based Financial Management | 39 | 5 | 20 | 9 | 35 | ⇧16 |
| ... | ... | ... | ... | ... | ... | ... |
|  | 383 |  | 261 |  | 338 | 77 |

88%

| 816 — Business Systems & Processes | Possible | Original Score | Weighted | Updated Score | Weighted | Change |
|---|---|---|---|---|---|---|
| Presence of contracts | 4 | 7 | 3 | 7 | 3 | ⇧0 |
| Presence of non-compete agreements | 2 | 7 | 1 | 7 | 1 | ⇧0 |
| ... | ... | ... | ... | ... | ... | ... |
|  | 43 |  | 35 |  | 38 | 3 |

DATABASE SYSTEM FOR DYNAMIC AND AUTOMATED ACCESS AND STORAGE OF DATA ITEMS FROM MULTIPLE DATA SOURCES

CROSS-REFERENCE TO RELATED APPLICATIONS

This application claims benefit of U.S. Provisional Patent Application No. 62/337,762, filed May 17, 2016, and titled "DATABASE SYSTEM FOR DYNAMIC AND AUTOMATED ACCESS AND STORAGE OF DATA ITEMS FROM MULTIPLE DATA SOURCES." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to data processing, including database and file management, as well as a database system and database-related methods for dynamic and automated access of particular data sources and electronic data items. Embodiments of the present disclosure further relate to selective and efficient integration of electronic data items.

BACKGROUND

Electronic databases provide for storage and retrieval of electronic data items. Data items in such databases may be electronically updated.

SUMMARY

The systems, methods, and devices described herein each have several aspects, no single one of which is solely responsible for its desirable attributes. Without limiting the scope of this disclosure, several non-limiting features will now be described briefly.

Embodiments of the present disclosure relate to a database system (also herein referred to as "the system") for dynamically and automatically accessing and storing data items from multiple data sources. The system may, for example, determine data sources to access, and ways of accessing data items from those data sources, based on an indication of an analysis level and/or other analysis criteria. Further, the system may selectively and efficiently integrate data items from the multiple data sources. Selective integration of data items may be based, for example, on the indication of the analysis level and/or other analysis criteria. The system may further generate outputs of the selective integration of data items. These outputs may, for example, include specialized reports and/or user interfaces. The outputs of the system, in some implementations, may be interactive and dynamically updated in response to user inputs, for example.

In some embodiments, a computing system is disclosed for dynamically accessing and integrating data items from one or more data sources or databases, the computing system comprising: one or more data stores storing: a plurality of analysis models, and a plurality of user data items in one or more databases; a computer processor; and a computer readable storage medium. The computer readable storage medium storing program instructions configured for execution by the computer processor in order to cause the computer processor to: receive analysis criteria including a user data item; store the first user data item in the one or more databases as one of the plurality of user data items; select, from the plurality of analysis models and based on the user data item, an analysis model, wherein: the analysis model defines a plurality of factors, the analysis model further defines a plurality of attributes, and each of the plurality of attributes is associated with at least one of the plurality of factors; determine, for each of the plurality of attributes, and based on at least some of the plurality of user data items, an attribute score; determine, for each factor of the plurality of factors, and based on the attribute scores of attributes associated with the factor, a factor score; and combine, as indicated by the analysis model, the factor scores to determine an analysis score.

In some embodiments, the program instructions are further configured for execution by the computer processor in order to cause the computer processor to: receive the analysis criteria further including a first analysis level; and generate, based on the first analysis level, user interface data useable for rendering a user interface including: the analysis score; and a score range gauge with a range from a minimum possible analysis score to a maximum possible analysis score, the score range gauge further comprising: an analysis score indicator configured to show where on the score range gauge the analysis score lies; a plurality of colored bands, each colored band representing a smaller range within the score range gauge.

In some embodiments, the program instructions are further configured for execution by the computer processor in order to cause the computer processor to: determine, based on at least some of the plurality of user data items, an industry; determine, based on the industry and at least some of the plurality of user data items, an industry code; determine, based on the industry code and at least some of the plurality of user data items, a minimum multiple and a maximum multiple; determine an estimated multiple, based on the minimum multiple, the maximum multiple, and the analysis score.

In some embodiments, the program instructions are further configured for execution by the computer processor in order to cause the computer processor to: receive the analysis criteria further including a second analysis level; and generate, based on the second analysis level, user interface data useable for rendering a user interface including: the analysis score; the estimated multiple; a score range gauge with a range from a minimum possible analysis score to a maximum possible analysis score, the score range gauge further comprising: an analysis score indicator configured to show where on the score range gauge the analysis score lies; and a plurality of colored bands, each colored band representing a smaller range within the score range gauge; and a multiple range bar with a range from the minimum multiple to the maximum multiple, the multiple range bar further comprising: an estimated multiple indicator configured to show where on the multiple range bar the estimated multiple lies.

In some embodiments, each factor score is associated with a minimum factor score and a maximum factor score, wherein the minimum factor score comprises a minimum possible value for the respective factor score, and wherein the maximum factor score comprises a maximum possible value for the respective factor score.

In some embodiments, the program instructions are further configured for execution by the computer processor in order to cause the computer processor to: receive the analysis criteria further including a second analysis level; and generate, based on the second analysis level, user interface data useable for rendering a user interface including: the analysis score; a score range gauge with a range from a minimum possible analysis score to a maximum possible analysis score, the score range gauge further comprising: an analysis score indicator configured to show where on the score range gauge the analysis score lies; and a plurality of colored bands, each colored band representing a smaller range within the score range gauge; and a plurality of factor range bars, each factor range bar associated with a factor score and ranging from the minimum factor score to the maximum factor score associated with the respective factor score, each factor range bar further comprising: an factor score indicator configured to show where on the factor range bar the associated factor score lies.

In some embodiments, the program instructions are further configured for execution by the computer processor in order to cause the computer processor to: determine, based on the analysis model, an external data source storing data useable in the analysis model; receive, from the external data source, another user data item; and store the another user data item in the one or more databases as one of the plurality of user data items.

In some embodiments, combining the factor scores to determine an analysis score comprises: determining, based on at least some of the plurality of user data items, a plurality of factor weights, each factor weight associated with a factor score; and performing a weighted summation of the factor scores with each factor score weighted by its associated factor weight.

In some embodiments, determining the attribute score for each of the plurality of attributes comprises: determining, based on at least some of the plurality of user data items, an attribute value associated with the attribute, the attribute value representing a quantitative value for the attribute; determining, based on at least some of the plurality of user data items, an attribute weight associated with the attribute, the attribute weight representing a maximum possible attribute score for the attribute; and combining the attribute value with the attribute weight to determine the attribute score.

In some embodiments, the program instructions are further configured for execution by the computer processor in order to cause the computer processor to: store the analysis score in the one or more data stores.

In some embodiments, the program instructions are further configured for execution by the computer processor in order to cause the computer processor to: receive a second analysis criteria including a second user data item; determine that a first analysis criteria was received; determine that the analysis score was stored in the one or more data stores; and retrieve the analysis score from the one or more data stores.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 6-8 illustrate example outputs of the system, according to embodiments of the present disclosure.

Figure 1A:
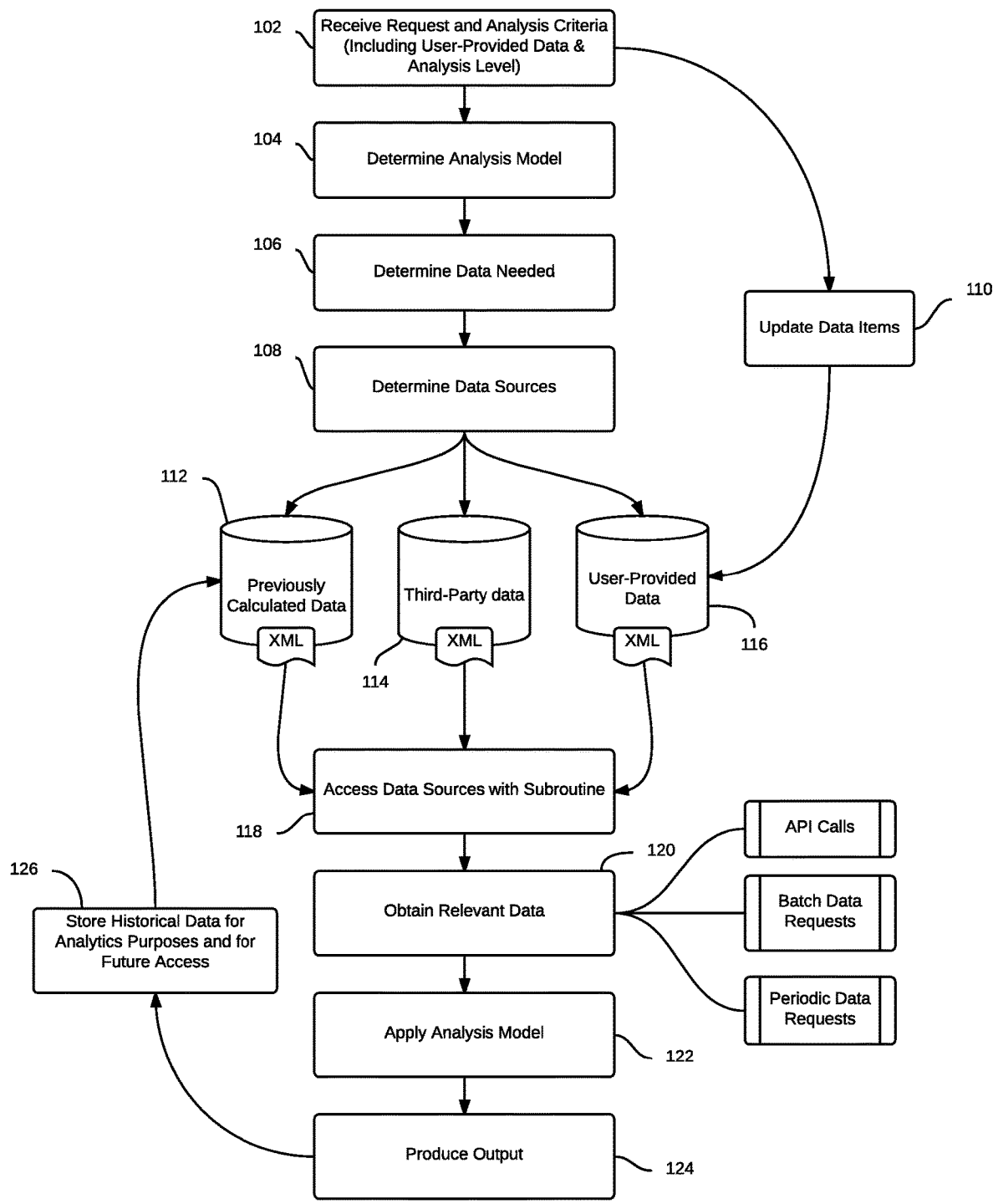
FIG. 1A is a flowchart illustrating an example operation of the system, according to embodiments of the present disclosure.

Throughout the drawings, reference numbers may be reused to indicate correspondence between referenced elements. Nevertheless, use of different numbers does not necessarily indicate a lack of correspondence between elements. And, conversely, reuse of a number does not necessarily indicate that the elements are the same.

DETAILED DESCRIPTION

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, embodiments of the present disclosure relate to a database system (also herein referred to as "the system") for dynamically and automatically accessing and storing data items from multiple data sources. The system may, for example, determine data sources to access, and ways of accessing data items from those data sources, based on an indication of an analysis level and/or other analysis criteria. Further, the system may selectively and efficiently integrate data items from the multiple data sources. Selective integration of data items may be based, for example, on the indication of the analysis level and/or other analysis criteria. The system may further generate outputs of the selective integration of data items. These outputs may, for example, include specialized reports and/or user interfaces. The outputs of the system, in some implementations, may be interactive and dynamically updated in response to user inputs, for example.

In an implementation, the system selectively accesses, integrates, and analyzes data items associated with a user. The system, for example, may analyze a user based on various data items associated with the user and further based on an analysis model. The data sources, how the data sources are accessed, what data items are accessed from the data sources, and the evaluation model may all be dynamically selected based on the analysis level and/or other analysis criteria. The analysis model may include indications of attributes, attribute weights, factors, factor weights, and/or other aspects, that may be processed by the system to evaluate and/or otherwise analyze a user.

For example, in some embodiments the user may be a company. Companies typically perform analytics or hire consultants in order to generate reports evaluating the various aspects of their business. These reports are used to improve the overall profitability or growth of their business by obtaining a better understanding of their business and potential areas for improvement. However, generating these reports may take considerable time and resources. The system may be able to evaluate the underlying business of the company in order to perform analytics and generate reports, while being able to factor-into the analysis the characteristic differences between businesses. To do so, the system may efficiently collect the data needed to perform the analysis and generate the reports, as described herein.

Adding further to this example in which the user is a company, the user may specify one or more desired analysis levels for evaluating their business. Various user data may be collected from various data sources according to the desired analysis level and the algorithms used. The user data may include qualitative data, such as company profiles, questionnaires, and assessments, as well as quantitative data, such as financial data, customer data, or management data. The system used the collected user data to perform analysis tailored to the characteristics of the business, such as scoring the business or assessing areas for improvement. The system may also generate a report based on the user-specified analysis level. The system may provide multiple levels of analysis depending on a user's needs, and each level of analysis may involve different analysis models depending on the user-provided data.

Thus, the system may evaluate the requested level of analysis and the user-provided data to determine an appropriate analysis model and the data sources that should be accessed in order to retrieve user data items. This aspect of the system improves efficiency by reducing unnecessary data transmission. In some embodiments, the system may be pre-configured with various subroutines that are each designed to retrieve a certain kind of user data item from a specific data source.

Going back to the example of a company as the user, the system may also account for various differences in the user data when performing the analysis. For example, the system may evaluate underlying business characteristics of the company, including the industry of the business, the size of the business, the location of the business, and so forth.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user.

Embodiments of the disclosure will now be described with reference to the accompanying figures. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide exemplary definitions.

User: Any entity that may be analyzed by the system and/or that may access or use the system (e.g., to provide user input). Non-limiting examples of a user include a person, a group of people, a legal entity (e.g., a company, business, partnership, corporation, and/or the like), an object (e.g., any type of good), a service, a legal instrument (e.g., a contract, agreement, license, and/or the like), and/or the like. A user may be an entity that requests analysis of a different entity. For example, a user may be company A that is seeking an analysis of company B. A user may also include a computer system associated with an entity, and the computer system may send systematic requests for analysis, including batch requests for multiple analyses to be performed.

User Input (also referred to as "Input"): Any interaction, data, indication, etc., received by the system from a user, a representative of a user, an entity associated with a user, and/or any other entity. Inputs may include any interactions that are intended to be received and/or stored by the system; to cause the system to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

Analysis Criteria: Any data or information received or accessed by the system associated with an analysis of a user. Non-limiting examples of analysis criteria include user information, analysis level, customizations of the analysis model, and/or the like. The system may use analysis criteria, for example, to select data sources, to determine how to access data sources, to determine what data items to access from data sources, to select an analysis model, to customize an analysis model, and/or the like.

User Information (also referred to herein as "User Data"): Any data or information associated with a user. User information may include any data items indicative of characteristics or attributes of a user. User information may also include any data used in analyzing or evaluating a user. Non-limiting examples of user information include industry (including, e.g., industry codes), size, revenue, profits, transaction multiples, revenue bands, and/or the like, and may also include qualitative data, such as company profiles, questionnaires, and assessments, as well as quantitative data, such as financial data, customer data, or management data. The system may use user information, for example, to analyze a user based on an analysis model. User information may be received via user inputs, from external data sources (e.g., third-party data sources via batch requests and/or API calls), from internal data stores (e.g., previously calculated data stores), and/or the like. User information may also include user-provided information/data, which may include any information provided by a user.

Analysis Model: Any method, process, or system for analyzing a user. An analysis model may be defined by one or more inputs, one or more outputs, one or more rules (including mathematical rules, algorithms, and/or the like). For example, as described herein, an analysis model may include indications of attributes, attribute weights, factors, factor weights, and/or other aspects that may indicate how data items (including user information) are to be integrated to analyze a user. The system may include multiple analysis models that may be selected based on analysis criteria. Alternatively, aspects (e.g., rules, weights, etc.) of a given analysis model may be adjusted by the system based on analysis criteria. In an implementation, the system may employ an analysis model to evaluate a user (e.g., to determine a valuation of a user, etc.). An analysis model of the system may incorporate any known methods of model generation, validation, iterative improvement, prediction, and/or the like. For example, an analysis model may be dynamic in that it may include feedback, improvement, and/or machine learning or artificial intelligence aspects. Accordingly, an analysis model may improve over time.

Analysis Score (also referred to herein as "Final Score"): Any output of the analysis model. Non-limiting examples include a quantitative number, a range of numbers, a report, or any other information that is associated with the evaluation of a user. The system may provide the analysis score to the user. For example, the system may employ user interface data for displaying the analysis score, and the analysis score may be incorporated or used with various user interface elements.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may combined and/or separated in any appropriate way into one or more databases, one or more tables of one or more databases, etc.

III. Example Operation of the System

FIG. 1 is a flowchart illustrating an example operation of the system, according to embodiments of the present disclosure.

At block 102, the system receives a request from a user for an analysis to be performed in order to produce a desired output. This request may be a query made in a web interface. This request may include, or come with, analysis criteria. In some embodiments, the analysis criteria may include the user's selection of an analysis level and user-provided data. The user-provided data may include user information that is useful in determining an analysis model. For example, if the user is a company, the user-provided data may include a company profile or company-related numbers that may be determinants of the appropriate analysis model to use.

The system may include multiple levels of analysis that may be indicated in the analysis criteria (e.g., by a user). Each analysis level may utilize a different analysis model. The system may select an analysis model based on the analysis level, the user-provided data, and/or any other analysis criteria. Furthermore, in order to perform an analysis with the different analysis models, the system may require different kinds of data items from different data sources, or additional data items and/or additional data sources. Accordingly, the analysis level, the user-provided data, and/or any other analysis criteria may affect which data items (and from which data sources) are needed to perform an analysis.

For example, in an embodiment the system may include five (or alternatively 3, 4, 6, 7, 8, 9, or any other number) different analysis levels, each of which may be configured to generate a respective customized report at a different level of detail. The system may generate different reports, for example, using different analysis models (or groups of analysis models). Further, the different reports may include, for example, different computations, information, and/or details. The different analysis levels may increase in complexity as the level of analysis increases. For example, in an example of two analysis levels, a level one analysis may be the most basic level of analysis that requires certain data items to compute, while a level two analysis may include the information from the level one analysis along with further analysis that requires additional data items to compute.

Some example embodiments of outputs based on various analysis levels are described below in reference to FIGS. 6 and 8.

As an example of user-provided data, consider the scenario in which the user is a company. The user-provided data may include any quantitative or qualitative data relevant to assessment of the company. In some cases, this user-provided data may be in the form of a company profile or a company questionnaire.

At block 110 the system may use that user-provided data to update the user-provided data database 116 in order to keep the user-provided data database 116 current. In some embodiments, the user may provide this user-provided data through a spreadsheet or any other data file. In other embodiments, the user may provide the data through a web interface, such as by answering a company questionnaire based on their knowledge of the company.

At block 104, the system determines the analysis model(s) to be used in performing the selected level of analysis. As previously mentioned, there may be different analysis models within each analysis level. The system may choose analysis models based on the analysis criteria, such as the user-provided data and the analysis level. As an example in which the user is a company, the analysis model used may change based on certain characteristics of the business, such as the type of business or the stage the business is in. For example, the system may include one analysis model that is applied to a pre-revenue or fast-growing company, and a different analysis model that is applied to more established companies. Different analysis models may use different types of data and/or different data sources. Thus, the analysis model and the data items used can depend on the analysis criteria specified by a user.

As described below, in some embodiments, different analysis models may differ in terms of which factors are evaluated, which attributes of those factors are evaluated, how the various factors and attributes are combined, and the weightings used in combining the various factors and attributes. More information about analysis models is provided in reference to FIG. 3.

At block 106, the system may, based on the determined analysis model, determine user data needed in order to complete the analysis. For example, an analysis model may have a pre-configured set of user data needed in order to perform the analysis. Examples of user data that may be used in the analysis models are described in reference to FIG. 5 below. An analysis model may utilize user data in order to perform the analysis. For example, if the user is a business the analysis model may utilize company-related data in order to perform the analysis.

At block 108, the system may determine the different data sources to access in order to obtain the necessary user data. In the embodiment of FIG. 1, the examples of different data sources include previously calculated data database 112, third-party data database 114, and user-provided data database 116. These databases may collectively hold the user data needed to perform the analysis, and any data in these databases may be user data. The user data may be held in datasets or databases, which may be stored locally, remotely, or with a third-party. In some embodiments, the user data is stored in XML format. In some embodiments, the user data may be held in spreadsheets.

At block 118, once the necessary user data and data sources have been determined, the system may access those data sources using pre-configured subroutines. In some embodiments, the various data sources are not accessible in the same way, and the subroutines may be pre-configured for accessing a specific data source in order to obtain a specific set of user data. For example, the system may use an API request that is formatted for specific data sources. The APIs may be internal and/or external. For internal databases, the system may perform a direct query of the internal database with no caching of data. In some embodiments, the system may utilize a subroutine in order to format or convert any user data accessed to a common format. For example, as shown in the figure the user data stored in the various data sources may be transported in XML format, and the system may utilize a subroutine to decompose the user data into typed data-structures to be processed and/or stored within the system.

Accordingly, in various embodiments, the analysis criteria provided at block 102 may be used by the system in order to select data sources, to determine how to access those data sources, to determine which user data items to access or obtain within those data sources, and determine an analysis model to apply. Once the system determines the analysis level, set of analysis criteria, and analysis model needed, it may determine the exact user data that needs to be obtained in order to perform the analysis. This may allow the use of common subroutines that are efficiently tailored for retrieving a specific type of user data from a specific data source. This reduces the time needed to retrieve all the necessary user data.

At block 120, the system may obtain the relevant user data from the accessed data sources. As shown in FIG. 1, some ways this may be performed include the use of API calls, batch data requests, and periodic data requests. In some embodiments, the system may parse the data received from the different data sources. For example, the system may receive the data through XML data streams and may parse the data.

Once the user data is obtained, the system may store the user data or it may not. In particular, it may be useful to internally save any user data obtained from a third-party source so it can be used in the future without needing to access the third-party source again, which improves the efficiency of the system in collecting user data. For example, if the user is a company being analyzed, then the system may determine that user data is needed from a third-party data source that holds data associated with various different companies, including the company being analyzed. The system may obtain the user data for the company being analyzed from the third-party data source by using an API call, and then save that user data in an internal database. In some embodiments, the system may store the obtained user data within previously calculated data database 112, third-party data database 114, and/or user-provided data database 116.

It should be noted however, that any stored user data may become outdated. Accordingly, the system may determine that user data used in the analysis is up-to-date. For example, when the system first obtains user data associated with a specific user from a third-party source, the system may also receive a hash value from a third-party source that is determined based on all of the user data associated with that user available to the third-party source. The system may associate the hash value with the third-party source and store it in any available database, such as within previously calculated data database 112, third-party data database 114, and/or user-provided data database 116. Every time the system performs another analysis on a prior user that requires user data from that third-party source, the system may retrieve an updated hash value from the third-party source that is determined based on the user data associated with that user available to the third-party source. The updated hash value may be compared to the hash value previously stored by the system for that user and third-party data source. If the hash values match, the system may recognize that the user data at the third-party source has not been updated and instead use stored user data. Alternatively, if the hash values do not match, the system may obtain the updated user data from the third-party source, and the system would then store the updated user data along with the updated hash value.

Alternatively, the system may not store user data. In the previous example, the system may continue to obtain user data from the third-party data source each time the user requests an analysis be performed. The benefit to this approach is that it is guaranteed the system is using up-to-date user data from the third-party data source, and there would not need to be a method implemented for keeping that user data up-to-date. However, this implementation may involve repeatedly retrieving user data from the third-party data source, and it may also involve paying fess to the third-party data source each time user data is accessed.

The system may access user data from data sources on demand or periodically. If the system is configured to access user data from a particular data source on demand, then the system can access that user data each time the analysis is to be performed. This configuration may provide the system with a great deal of flexibility by allowing the system to obtain the user data whenever it is needed. Alternatively, a system may be configured to access user data from a particular data source periodically. This configuration may be beneficial for accessing user data that is not frequently updated. The system may further access the data source at periodic intervals and check for updates. The system may also store any retrieved user data internally, which may allow the system to have on-demand access to that user data and reduce drawbacks associated with accessing a data source periodically.

The system may, in some implementations, access batches of user data or single user data items from a data source. For example, the system may access all user data from a data source associated with a particular user. This may be useful if the system is accessing a third-party data source, since all the user data for a particular user can be obtained and stored internally for future use (e.g., future analysis of the user) and the system may only have to check that user data is up-to-date for a future analysis. The system may also be able to access a batch of specific user data that is relevant to the particular analysis model, so that irrelevant user data is not retrieved. This may improve the efficiency of the system by reducing transmission size. Alternatively, or in addition, the system may access single user data items from a data source. For example, a particular data source may contain only a single user data item that is relevant to the analysis model and the system can retrieve that particular user data item. In some implementations, the system accesses user data related to many users and/or potential users in batch from one or more data sources, storing the data locally (e.g., in a data store of the system). Such user data may be stored by the system and updated periodically or on demand by further batch access of the one or more data sources. Accordingly, the system may be optimized to access data sources on-demand, in batch, via APIs or other methods, and/or the like, as needed to perform analyses efficiently. Further, over time the system may continue to store and aggregate user data, reducing the need for further access of external data sources (thereby increasing efficiency of the system and reducing bandwidth needs).

At block 122, the data is evaluated using the determined analysis model and the analysis is performed. Implementation of the analysis model is described in detail below in reference to FIGS. 3 and 4.

At block 124, results of the analysis are used in order to produce an output. In some embodiments, the output may be a report and/or a user interface that is accessible by the user. The report may have user interface elements used to convey the results of the analysis in a more-accessible manner. For example, the report may include bars, graphs, and other graphics that provide more contexts to certain numbers or statistics provided to the user.

At block 126, some of the historical data may be saved in previously calculated data database 112 for analytics purposes or for future use and reference. For example, a past analysis may be useful in a future analysis. For example, if the user specified a first level of analysis for a first report, and then came back later wishing to do a second level of analysis that necessarily includes the previous analysis, then it may be more efficient to save the previous analysis to be re-used wherever applicable in future analysis. In other words, in some embodiments the previously calculated data database 112 may be used to hold not only user data, but also data associated with previously-completed analysis that can be used in a future analysis for a user. The system may utilize the previously calculated data database 112 in order to avoid unnecessary recalculation or analysis of user data. Thus, storing previously calculated data can improve the efficiency of the system by reducing the amount of calculations and processing needed for repeat users.

Figure 1B:
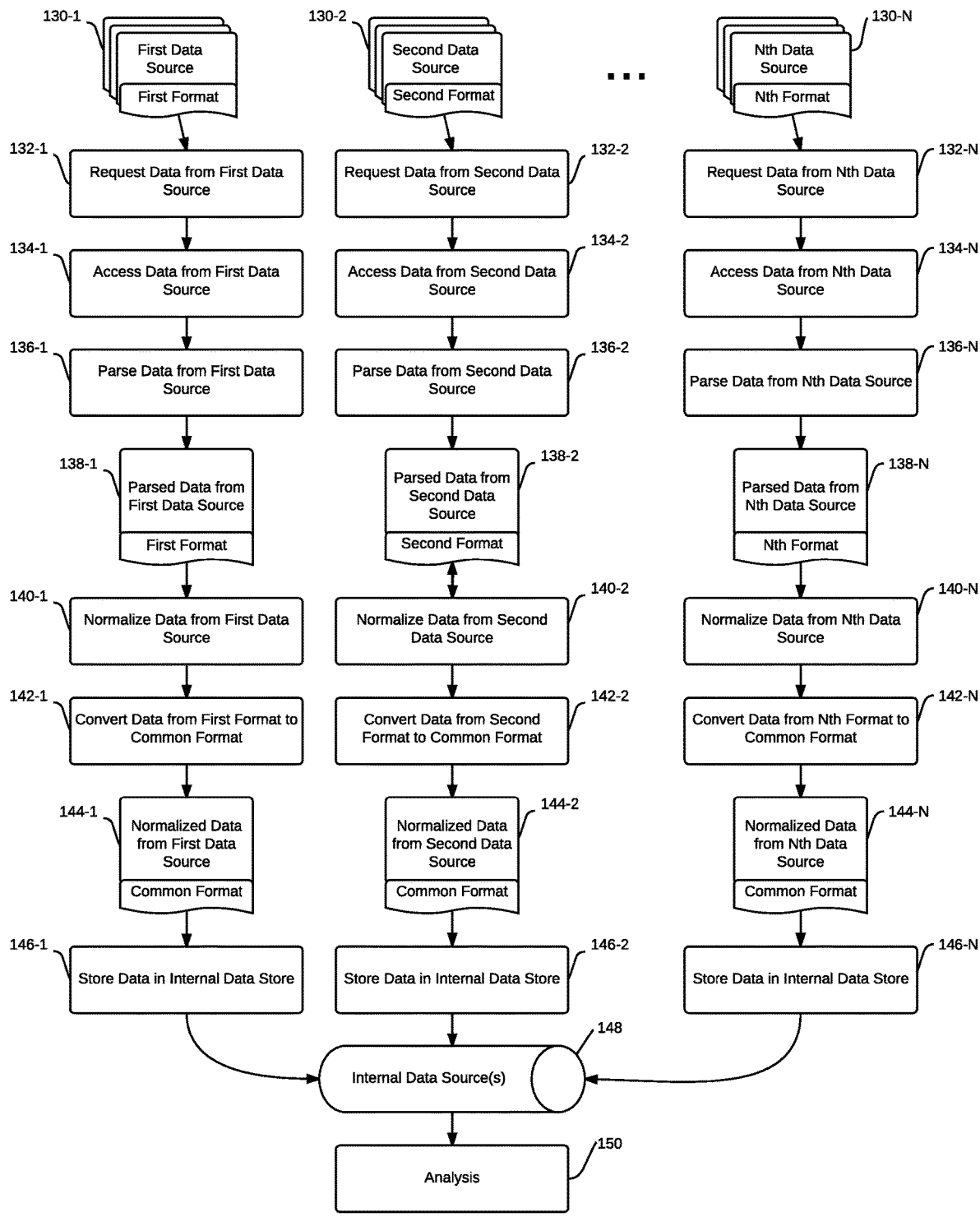
FIG. 1B is a flowchart illustrating an example operation of the system, according to embodiments of the present disclosure.

FIG. 1B is a flowchart illustrating an example operation of the system, according to embodiments of the present disclosure.

The system may be able to access data from any number of data sources, which are shown in the figure as data sources 130-1 to 130-N. As shown, there is a first data source 130-1 that provides data in a first format, a second data source 130-2 that provides data in a second format, and a Nth data source 130-N that provides data in a Nth format. In some cases, the data formats for different data sources may be the same (e.g., the first format and the second format used by the first and second data sources may be the same). An example of a data format is Extensible Markup Language (XML).

At blocks 132-1 to 132-N, the system requests data from a particular data source. As shown in block 132-1, the system may request data from the first data source 130-1. At block 132-2, the system may request data from the second data source 130-2. At block 132-N, the system may request data from the Nth data source 130-N.

At blocks 134-1 to 134-N, the system accesses data from a particular data source. As shown in block 134-1, the system may access data in the first format from the first data source 130-1. At block 134-2, the system may access data in the second format from the second data source 130-2. At block 134-N, the system may access data in the Nth format from the Nth data source 130-N.

At blocks 136-1 to 136-N, the system parses any data received from the various data sources in order to produce parsed data 138-1 to 138-N. At shown in block 136-1, the system may parse the data received from the first data source 130-1 in order to produce parsed data 138-1. At block 136-2, the system may parse the data received from the second data source 130-2 in order to produce parsed data 138-2. At block 136-N, the system may parse data received from the Nth data source 130-N in order to produce parse data 138-N. An example of when parsing the data would be useful is if the data is sent in a stream, such as a XML stream, and the system could parse the data into individual user data items.

At blocks 140-1 to 140-N, the system normalizes any data retrieved from the various data sources. As shown, the parsed data 138-1 to 138-N from the various data sources may be normalized or pre-processed. For example, certain user data values may be normalized to be between a certain ranges for the analysis, which allows those values to be easily compared to that range (e.g., normalizing a value to be between 0 and 1). There may also be user data that needs to be pre-processed or cleaned. For example, a user data item received from a data source may be the address of the user which contains the word "Street". The system may change that instance of the word "Street" to "St.", so that addresses are consistent across users. As shown in block 140-1, the system normalizes the parsed data 138-1 from the first data source 130-1. At block 140-2, the system normalizes the parsed data 138-2 from the second data source 130-2. At block 140-N, the system normalizes the parsed data 138-N from the Nth data source 130-N.

Further on the subject of normalizing, any user data items may be normalized or pre-processed. A common use of normalization may be to convert quantitative values so that they reside within the same scale or utilize the same metric/unit. This may be useful for comparing between user data for a user, comparing user data between multiple users, or comparing user data against data for a group (e.g., values for an industry). For example, if the user is a business, then the revenue for the user may be provided in euros. If the European numbering convention is used, numbers over a thousand may be expressed with points instead of commas, and decimals may be expressed with commas instead of periods (e.g., 1.000,00 instead of 1,000.00). Normalizing the revenue may include converting the number into a different standard, such as USD, as well as changing the representation of the number to American convention. This allows the user's revenue to be quickly compared to another revenue value in USD, such as another user's revenue or the typical revenue for that industry. It also allows calculations to be made based on those values, such as calculating gross profit by subtracting costs (which may also be normalized into USD) from the revenue. Thus, normalizing certain user data items prior to the analysis may improve the processing speed and efficiency of the system, especially if those user data items are used repeatedly in comparisons or calculations. The system only needs to normalize that user data once, rather than repeatedly during the analysis.

At blocks 142-1 to 142-N, the system converts any data, received from the various data sources, into a common format. In some embodiments, the system may be configured to perform analysis on user data that is in a specific common format, and the data may be stored internally in that common format. A specific common format may be chosen to improve processing speed, reduce storage size, allow for better data manipulation, and so forth. For example, the system may retrieve a table of data in CSV format from a data source. The CSV file may take up more space and require more processing power to access than a different format, such as a tab-delineated text file. Thus, the system may take the contents of the CSV and transfer them to a tab-delineated text file. In another example, as described below, the common format may include specific tags for data items. For example, incoming data may include a label for a business name as "business", which the system may standardize to the label "entity." At block 142-1, the system may convert normalized, parsed data from the first data source 130-1 in the first format to the common format, in order to produce normalized data 144-1 in the common format. At block 142-2, the system may convert normalized, parsed data from the second data source 130-2 in the second format to the common format, in order to produce normalized data 144-2 in the common format. At block 142-N, the system may convert normalized, parsed data from the Nth data source 130-N in the Nth format to the common format, in order to produce normalized data 144-N in the common format.

At blocks 146-1 to 146-N, the system stores the normalized data 144-1 to 144-N in the common format to an internal data store, such as Internal Data Source(s) 148. At block 150, the data is used to perform the analysis as described herein.

Figure 1C:
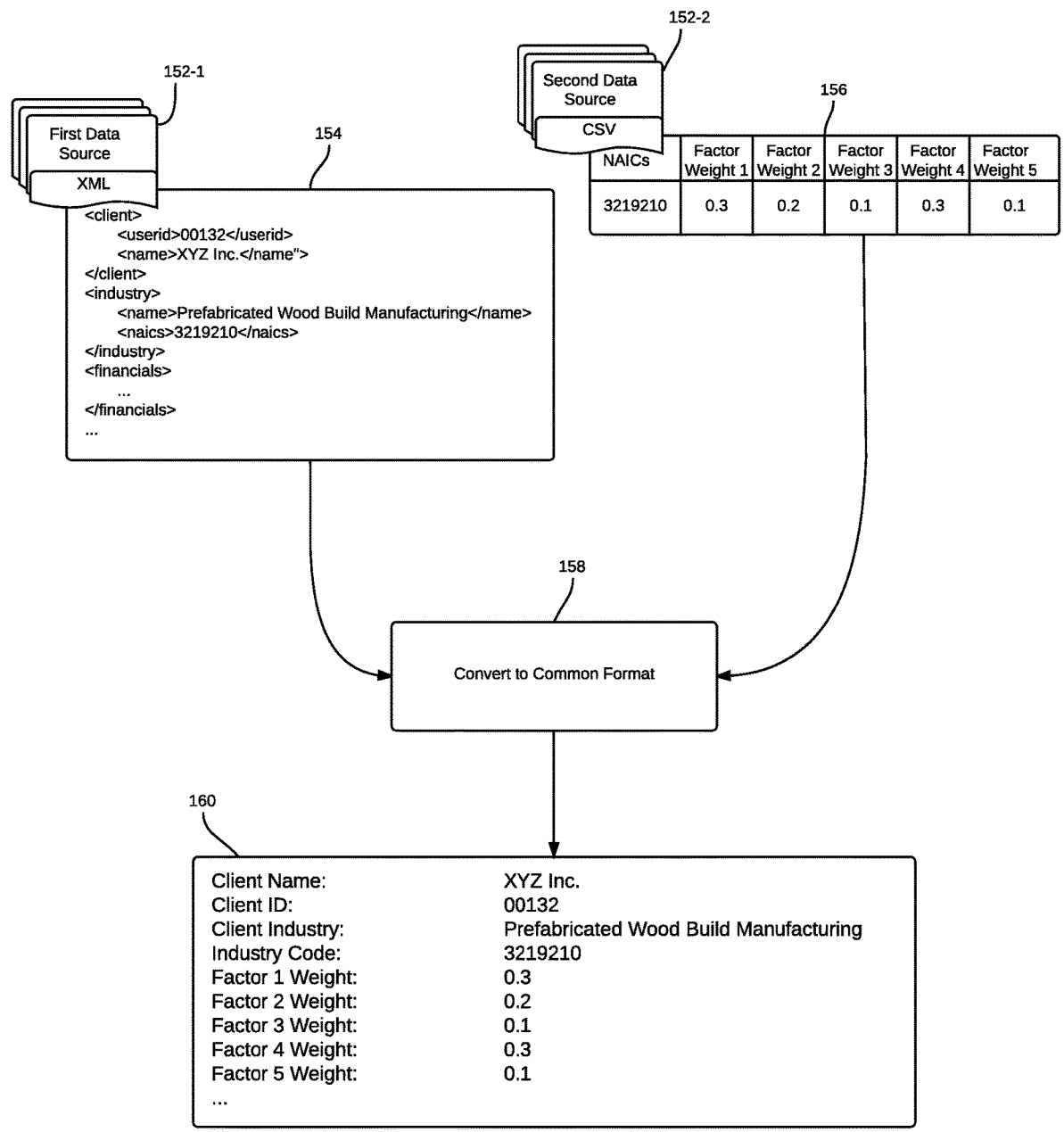
FIG. 1C is a flowchart illustrating an example operation of the system, according to embodiments of the present disclosure.

FIG. 1C is a flowchart illustrating an example operation of the system, according to embodiments of the present disclosure.

A first data source 152-1 may provide data in XML format, including user data 154. User data 154 is seen containing a userid associated with the user, a name associated with the user, the industry of the user, the industry (NAICs) code of the user, and other user data such as financial data.

A second data source 152-2 may have data in CSV format, including user data 156. User data 156 is seen as a table containing five factor weights which are referenced by a NAICs code. A full table may have numerous rows of different NAICs codes and different factor weights associated with those NAICs codes. The NAICs code for a user may be used to look up factor weights in user data 156 to be used in the analysis.

At block 158, the system may convert the user data 154 and user data 156 into a common format. As shown, the user data 154 and user data 156 are shown converted into a tab-delineated text format and combined into user data 160. However, user data 154 and user data 156 do not necessarily have to be combined, and they may be converted and stored independent from each other in one or more files (e.g., there may be one file containing the information in user data 154 in a common format and a separate file containing the information in user data 156 in a common format) and/or as one or more data items.

Thus, as shown in FIGS. 1A-1C, and as contemplated throughout this disclosure, the system may be able to process batches of data items in real-time. Thousands, hundreds of thousands, millions, and/or more, of data items may be processed per second. This allows a tremendous amount of data items from multiple sources to be quickly retrieved, integrated, and used in an analysis. The rates at which the data items may be processed by the system are beyond the capabilities of a human being, and allow for the results of the analysis to be quickly presented to a user upon request, e.g., in real time and/or substantially real time.

IV. Example System Architecture

Figure 2:
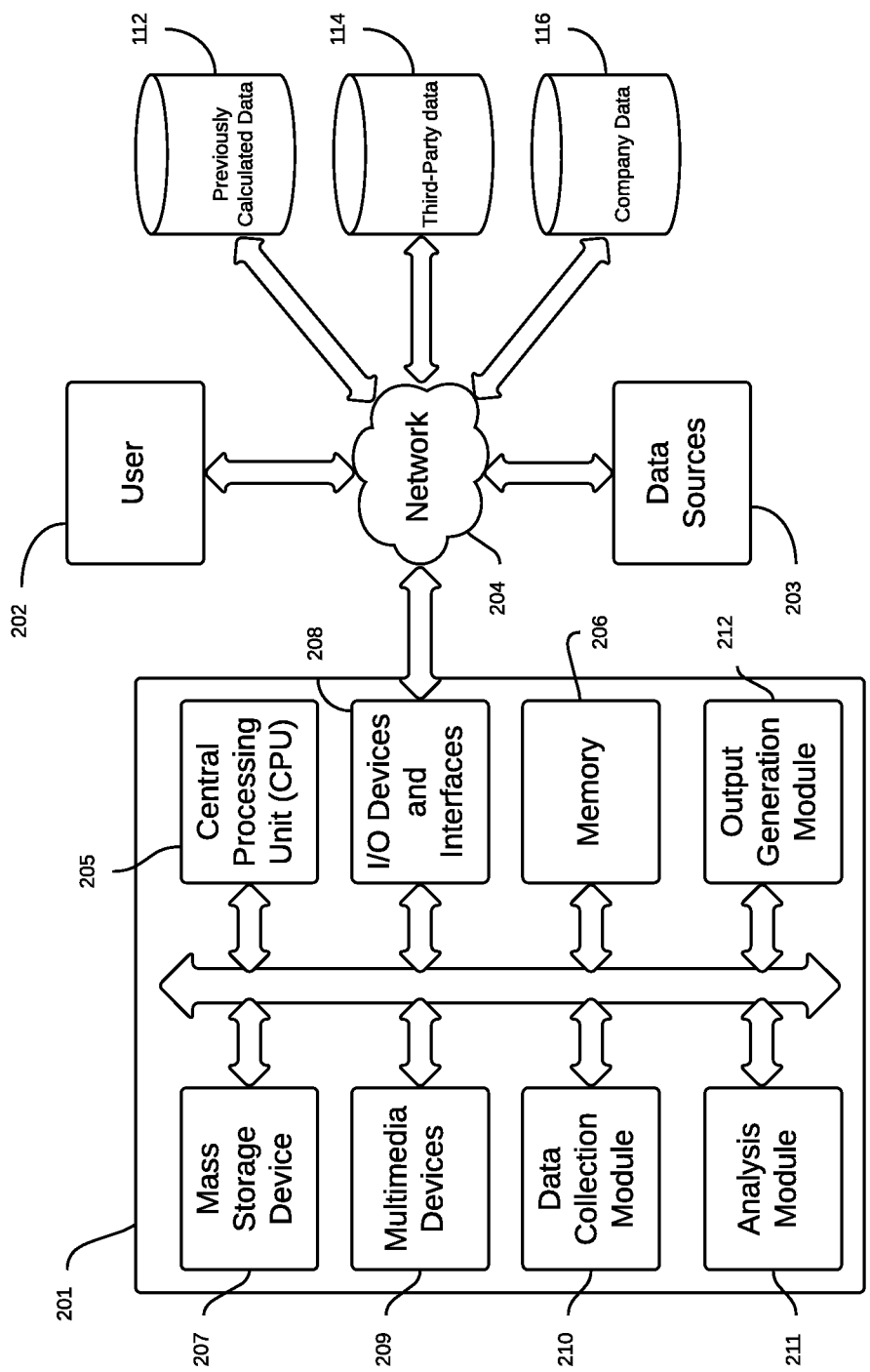
FIG. 2 is a block diagram illustrating various aspects of the system, according to embodiments of the present disclosure.

FIG. 2 is a block diagram illustrating various aspects of the system, according to embodiments of the present disclosure. In the embodiment of FIG. 2, a computing device 201 is in communication with a user 202, as well as various data sources 203, via a network 204. In an embodiment, the computing device 201 receives data, such as user data, from one or more data sources 203 and accesses the user data to retrieve quantitative and qualitative information associated with the user. The user data may originate from one or more databases or datasets, including previously calculated data database 112, third-party data database 114, and user-provided data database 116. The computing device 201 may then perform analysis and prepare information for presentation to the user 202, as described herein. Accordingly, the systems and methods described herein may be implemented by various aspects of the block diagram of FIG. 2.

User 202 may interact with the system through a user computing device (not pictured). This interaction may be through an user interface that is generated and displayed on the user computing device, and the user 202 may be able to provide input through the user interface in order to provide analysis criteria. The user interface may also allow any generated output from the system to be displayed to the user 202. In some embodiments, computing device 201 may generate the user interface data or provide the user interface data used by the user computing device to generate the user interface. As an example, network 204 may be the Internet and user 202 may utilize a web browser on their user computing device to navigate network 204 and direct it to a web address associated with the system. The web browser may render a user interface that allows a user to provide analysis criteria, such as selecting an analysis level or submitting any user-provided data. The analysis criteria may be transmitted to computing device 201 through network 204, and computing device 201 may perform the analysis as described herein. Afterwards, computing device 201 may send the results of the analysis to the user computing device, where it is rendered for viewing by user 202.

Data sources 203 may include both internal or external data sources, both of which may be accessible over network 204. Internal data sources may refer to data sources owned and/or operated by the operator of the system. For example, an internal data source may be a database within a cloud computing service that is also running the system. External data sources may include data sources owned and/or operated by a third-party (a third-party data source). The third-party may be a user, or it may be a non-user third party or service. For example, a user may be third-party when it provides user-provided data by storing it on a server in order for the system to access that server to retrieve that user-provided data. Alternatively, a user may provide user-provided data directly to the system to be stored in an internal data source; thus, user-provided data may be stored internally and/or externally. Alternatively, the third-party may be a service that tracks and keeps any user data relevant to the analysis. In the example of the user being a company, a third-party may keep various user data on that company (e.g., rankings, calculated metrics, and so forth) in an external data source that can be accessed by the system.

Data sources 203 may be free and/or paid-for data sources. Some data sources may provide user data for free and be freely accessible by the system. Other data sources may charge for providing user data using a variety of payment schemes. Certain data sources may charge based on the amount of data items transferred or total bandwidth used, while other data sources may charge per request. The system disclosed herein may provide economic and technical efficiencies when it comes to accessing and retrieving data from paid data sources. Since the system determines, prior to performing the analysis, all of the necessary user data and the corresponding data sources from which to obtain that user data, a data source is only accessed if it is required for a particular analysis. Furthermore, the system retrieves only the relevant user data available from that data source. This reduces the number of connection requests to the paid data sources, as well as reduces the amount of data items transferred from the paid data sources. The end result is lower costs and charges associated with paid-for data sources, and optimized use of bandwidth and processing power.

Additional economic and technical efficiencies are provided by storing relevant user data for a particular user and any previously-performed analysis for a particular user. For example, this data may be stored in an internal data source and may be used in a future analysis for that user. In this scenario, once a user submits a request the system may be able to check the internal data source for any relevant data for that user. If the system finds data in the internal data source corresponding to the user, then the system may retrieve that data and use it instead of obtaining that data from a different data source. Thus, the system may prioritize internal data over data from a paid data source. This also reduces the number of connection requests to the paid data sources, as well as reduces the amount of data items transferred from the paid data sources.

The network 204 may include any communication network or combination of communication networks, such as one or more of the Internet, LANs, WANs, MANs, etc., for example. In the embodiment of FIG. 2, the computing device 201 includes a computing system having one or more computing devices (e.g., computers). The computing device 201 may include, for example, a single computing device, a computer server, a smart storage unit, or a combination of one or more computing devices and/or computer servers. Depending on the embodiment, the components illustrated in the computing device 201 may be distributed amongst multiple devices, such as via a local area or other network connection. In other embodiments the computing device 201 may include fewer and/or additional components that are illustrated in FIG. 2.

The exemplary computing device 201 may be a general purpose computer using one or more microprocessors, such as, for example, an Intel® Pentium® processor, an Intel® Pentium® II processor, an Intel® Pentium® Pro processor, an Intel® Pentium® IV processor, an Intel® Pentium® D processor, an Intel® Core™ processor, an xx86 processor, an 8051 processor, a MIPS processor, a Power PC processor, a SPARC processor, an Alpha processor, and so forth. The computer may run a variety of operating systems that perform standard operating system functions such as, for example, opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Windows® 7, Palm Pilot OS, Apple® MacOS®, Disk Operating System (DOS), UNIX, IRIX, Solaris, SunOS, FreeBSD, Linux®, or IBM® OS/2® operating systems. In other embodiments, the computing device 1401 may be controlled by a proprietary operating system. Conventional operating systems control and schedule computer processes for execution, perform memory management, provide file system, networking, I/O services, and provide a user interface, such as a graphical user interface ("GUI"), among other things.

The computing device 201 includes one or more central processing units ("CPU") 205, which may each include one or more conventional or proprietary microprocessor(s). The computing device 201 may further include one or more memories 206, such as random access memory ("RAM"), for temporary storage of information, read only memory ("ROM") for permanent storage of information, and/or a mass storage device 207, such as a hard drive, diskette, or optical media storage device. The memory 206 may store software code, or instructions, for execution by the processor 205 in order to cause the computing device to perform certain operations, such as processing the data with statistical and/or predictive models, formatting data for user devices or other presentation, transmitting data, or other operations described or used herein.

The exemplary computing device 201 may include one or more input/output (I/O) devices and interfaces 208, such as a keyboard, trackball, mouse, drawing tablet, joystick, game controller, touchscreen (e.g., capacitive or resistive touchscreen), touchpad, accelerometer, and/or printer, for example. The computing device 201 may also include one or more multimedia devices 209, such as a display device (also referred to herein as a display screen), which may also be one of the I/O devices 208 in the case of a touchscreen, for example. Display devices may include LCD, OLED, or other thin screen display surfaces, a monitor, television, projector, or any other device that visually depicts user interfaces and data to viewers. The computing device 201 may also include one or more multimedia devices, such as speakers, video cards, graphics accelerators, and microphones, for example.

In the embodiment of FIG. 2, the I/O devices and interfaces 208 provides a communication interface to various external devices via the network 204. For example, the computing device 201 may be electronically coupled to the network 204 via a wired, wireless, or combination of wired and wireless, communication link(s). The network 204 may allow communication with various other computing devices and/or other electronic devices via wired or wireless communication links.

In the embodiment of FIG. 2, the computing device 201 may include a data collection module 210, an analysis module 211, and an output generation module 212, as well as other modules or fewer modules. In this embodiment, each of the modules is shown as part of the computing device 201. However, in other embodiments, the modules may be distributed across multiple devices, and may be controlled and/or operated by multiple different entities. These modules are configured to perform methods as described throughout this specification. In various embodiments, fewer or additional modules may be included within a computing system.

Data collection module 210 may be configured to determine the user data needed to perform an analysis, which data sources to obtain the user data from, how to obtain the user data (e.g., which subroutines to use), as described herein. Further, the data collection module 210 may access and obtain the user data, as described herein. For example, if the user was a company being evaluated, information associated with the company (e.g., financials) may be distributed across different data sources. The specific user data needed would also depend on the analysis model. Data collection module 210 may handle the collection of all the user data needed for the analysis.

Analysis module 211 may be configured to use the collected user data to perform an analysis based on an analysis model, as described herein. For example, if the user was a company being evaluated, the analysis module 211 may be tasked with valuing the company based on different metrics, identifying opportunities for improvement or growth, and so forth.

Output generation module 212 may be configured to take the results of the analysis and arrange or present them to the user, as described herein. Output generation module 212 may be able to generate a report or interactive user interface that allows the results of the analysis to be easier understood.

The computing device 201 may be configured to acquire user data from various sources, including local data, remote data, third-party data sources, and so forth. The device may be adapted to communicate using a variety of network or communications protocols in order to communicate with the sensors or external data sources. Some of these protocols may include standard network protocols, such as HTTP, FTP, SNMP, or the like. The device may further include hardware drivers, such as USB, FireWire, Thunderbolt (Light Peak), or serial communications drivers, for example to communicate with devices in direct communication with the system.

The computing device 201 may be configured to transmit, or initiate transmission of, data such as user interfaces, data reports, application programming interface, data, or the like, to requesting entities, such as external user 202, that have registered interest with the system. In one embodiment, the device provides the data in an unformatted data structure, such as in an XML, CSV, TXT, or other spreadsheet, text, or web accessible data structure. In other embodiments, the device provides information in user interfaces, such as user interfaces that are configured for rendering by a web browser, mobile device, tablet device, or other device or application, for display to users. A variety of different presentations may be provided. In some embodiments, the requesting entities may indicate presentation preferences or configurations (e.g., data formats and/or types of information), and the device may transmit data based on the indicated preferences or configurations. The presentation format may also be determined based on the type of device being used by the user.

In an embodiment, any or all of the modules 210-212 are configured to act in real time or substantially real time. Thus, when data is received by the modules, the modules process that data as soon as practicable or necessary to provide users with timely information. In order to achieve this, specialized hardware may be used to gain efficiency, and executable code may be designed to minimize latency or computation time. In an embodiment, the modules, possibly with other modules of the system, are executed within a real-time operating system, to enhance the responsiveness of the system.

In some embodiments, the system described herein may be run in a hosted computing environment, such as an enterprise computing environment or a cloud computing environment. Thus, the system may be run on one or more computing devices, which may perform the functions of computing device 201 in aggregate. In the scenario in which the system is run in a cloud environment, the system may be accessible via the Internet. Thus, network 204 may be the Internet and may be used to provide user 202 access to the system, as well as to transfer data between the system and data sources 203.

There may be advantages and efficiencies associated with running the system on a cloud computing environment. For example, there may be similar tasks or processes which can be broken up and distributed over the pool of available computing resources. In one scenario, the system may access a large plurality of data items from a certain data source and the data items may need to be converted into a common format. If the data items are to be processed independent from each other, than multiple subroutines or sub-processes can be used to simultaneously convert multiple data items at a time. The rate at which multiple data items are processed may be increased with additional subroutines or sub-processes, which provides scalability to the system. The system also gains reliability due to the extra redundancy from having multiple subroutines in case one does not work. In another scenario, the system may be accessing data items from multiple data sources. There may be multiple sets of subroutines or sub-processes which can be used to access data from multiple data sources, with each set of subroutines specifically tailored to a specific data source. Since the necessary data items and the corresponding data sources may be determined beforehand, the efficiency of the system is improved by allowing the system to obtain data from multiple data sources at the same time.

In an implementation the computing device 201 (or one or more aspects of the computing device 201) may comprise, or be implemented in, a "virtual computing environment". As used herein, the term "virtual computing environment" should be construed broadly to include, for example, computer readable program instructions executed by one or more processors (e.g., as described herein) to implement one or more aspects of the modules and/or functionality described herein. Further, in this implementation, one or more modules/engines/etc. (e.g., any or all of the modules 210-212) of the computing device 201 may be understood as comprising one or more rules engines of the virtual computing environment that, in response to inputs received by the virtual computing environment, execute rules and/or other program instructions to modify operation of the virtual computing environment. For example, a request received from the user 202 may be understood as modifying operation of the virtual computing environment to cause the data collection module 210 to collect data associated with the request, the analysis module 211 to analyze the collected data as described herein, and the output generation module 212 to generate outputs based on the analyzed data, as described herein. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by, and/or responses received and analyzed by, the modules 210-212. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the computing device 201 as a virtual computing environment may advantageously enable executing different aspects or modules of the system on different computing devices or processors, which may increase the scalability of the system. Implementing one or more aspects of the computing device 201 as a virtual computing environment may further advantageously enable sandboxing various aspects, data, or modules of the system from one another, which may increase security of the system by preventing, e.g., malicious intrusion into the system from spreading. Implementing one or more aspects of the computing device 201 as a virtual computing environment may further advantageously enable parallel execution of various aspects or modules of the system, which may increase the scalability of the system. Implementing one or more aspects of the computing device 201 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

V. Example Data Analysis

Figure 3:
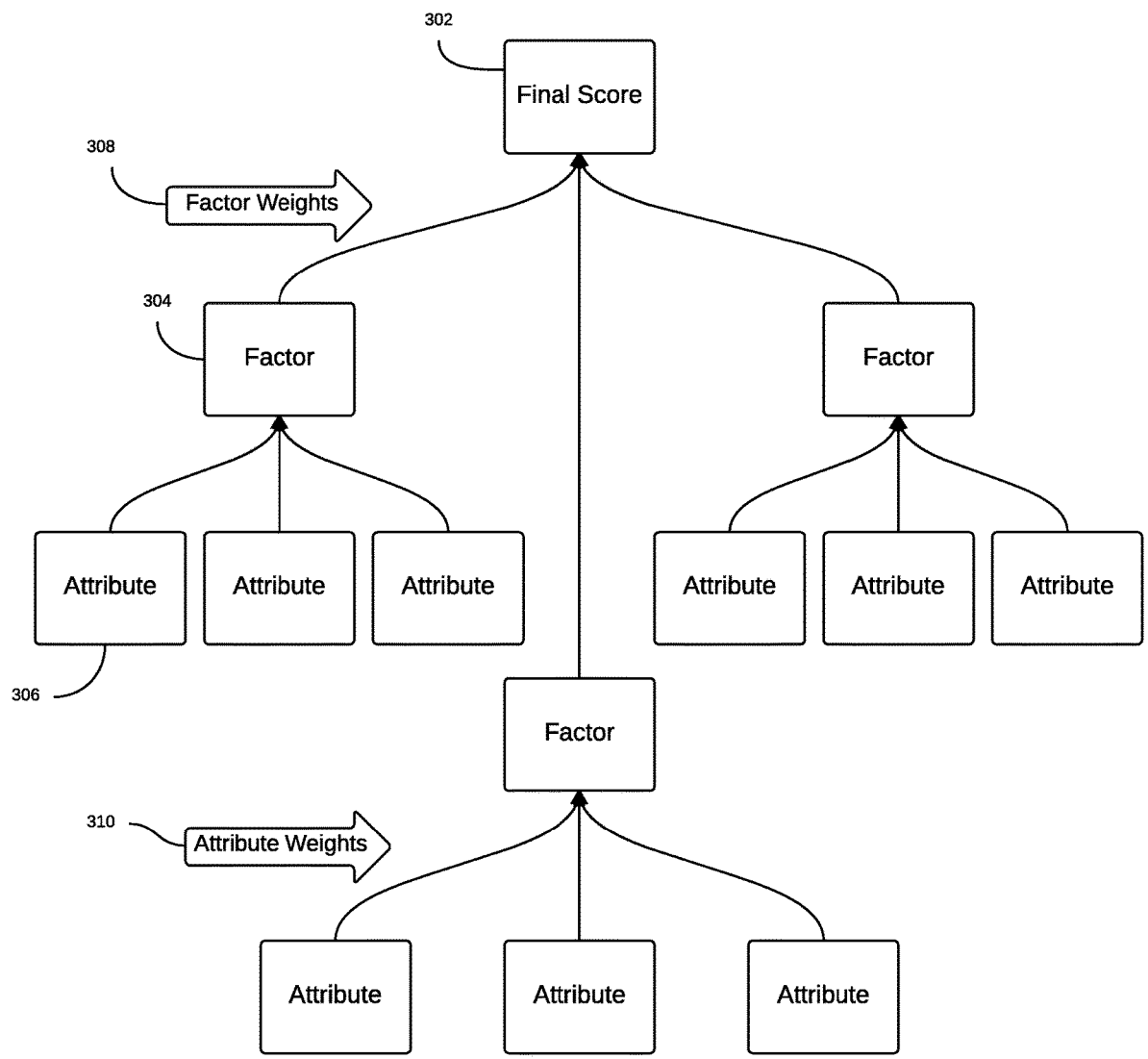
FIG. 3 is a diagram illustrating example aspects of an analysis model, according to embodiments of the present disclosure.

FIG. 3 is a diagram illustrating example aspects of an analysis model, according to embodiments of the present disclosure. More specifically, the figure provides an overview of the various components used in the analysis model. However, the analysis model may also utilize features described below in reference to the alternative example provided in FIG. 11. Thus, features described in reference to FIG. 3 and FIG. 11 may be used in any combination.

In some embodiments, the analysis being performed or the report being generated may include a final score 302, which may be used as a quantitative summary of the analysis. The analysis model may be configured to calculate the final score 302 using different types of user data. In some embodiments, the final score 302 may be the main objective of the report. An example of a calculated final score 302 provided to a user in a report is described below in reference to FIG. 6. One algorithm for calculating the final score 302 may be through regression, while another example algorithm for calculating final score 302 may be factor analysis. Additional information is provided in the alternative example provided in FIG. 11.

As an example, if the user is a company seeking to have their business evaluated, the final score 302 may be an overall score of the underlying business across different metrics that is calculated using company-related data. In various implementations that final score 302 may represent, for example, a valuation of the user/company, an effectiveness of the user/company, and/or the like.

In some embodiments, the final score 302 may be calculated based on the scores of one or more factors 304. This calculation may be performed in any number of ways. For example, the final score 302 may be a weighted summation of the factor scores of the one or more factors 304 based on factor weights 308. Thus, the final score 302 may be based on the relative importance of the different factor categories used to calculate it. In some embodiments, the final score 302 may be designed or normalized to be within a certain score range.

In some embodiments, the factors 304 may be categories or aspects of the user being evaluated. While three factors are represented in FIG. 3 for convenience, a given analysis model may include any number of factors 304. The analysis may be able to analyze and score the factors 304 individually, so that each factor is associated with a factor score.

For example, if the user is a business being evaluated, there may be five total factors 304, which may include, for example, "Financial Performance", "Base Business", "Business Systems & Processes", "Senior Management Team", and "Growth/Opportunity". Accordingly, an analysis model may be used to evaluate and score a business in these categories.

The factor weights 308 are used in combining the scores associated with factors 304 into final score 302. The factor weights 308 may depend on how final score 302 is calculated and the relative importance of the different factors 304 in a given analysis model. In some embodiments, the final score 302 is a weighted sum of the factor scores of factors 304. In some embodiments, individual factor weights in factor weights 308 may be between 0 and 1, and they may sum up to 1. In some embodiments, the factor weights 308 may be differentially weighted with more important factors given disproportionately more weight.

Figure 5:
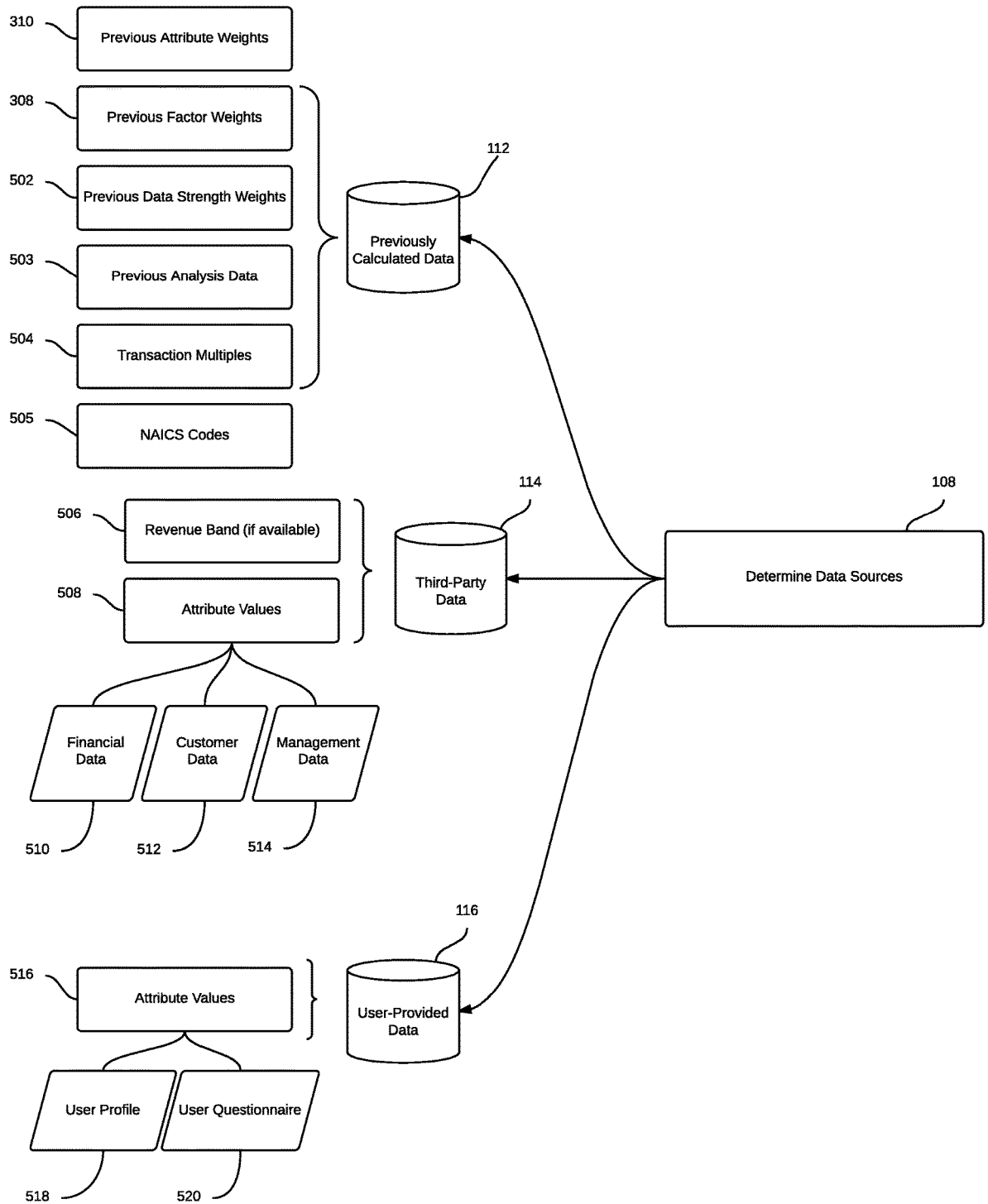
FIG. 5 is a block diagram illustrating examples of the various types of data that may be integrated by the system, according to embodiments of the present disclosure.

As an example, consider the scenario in which the user is a business. An analysis model may be selected in which the different factor weights 308 may be related to the characteristics of the business (e.g., user information) being evaluated, since different factors may be more important in assessing some businesses than others. For example, the values of factor weights 308 may be dependent on any analysis criteria including, for example, the industry of the business, the size of the business, the geographic aspects of the business, and so forth. This reflects the reality that completely different users should be evaluated differently, as some factors will be more relevant or important to some users than others. The factor weights 308 may be predetermined and can be part of an analysis model and/or a data item that is retrieved by the system, as shown in FIG. 5.

The attributes 308 may be more-granular characteristics of the user being evaluated, and they may be grouped under a factor. The attributes 308 may be evaluated and scored, and the factors 304 may each be determined or calculated based on the scores of one or more attributes 306 that are grouped under them. While three attributes are represented as associated with each factor in FIG. 3 for convenience, a given analysis model may include more or fewer attributes associated with factors. Further, a given attribute in a given analysis model may be associated with a single factor or multiple factors, and each factor may have a different number of attributes associated with it. Calculating a factor value may be performed in any number of ways. For example, each factor 304 may be a weighted summation of the attribute scores that make up the factor using attribute weights 310. However, it need not be a weighted summation. In other embodiments, the weightings may be aggregated in any other way. For example, the weightings may be non-linear or differentially weighted, with more important attributes given disproportionality more weight.

As an example of attributes 308, if the user is a company being evaluated, a "Growth/Opportunities" factor may include attributes such as opportunities for revenue growth, opportunities for margin improvement, the scalability of the business product or service, and any other business characteristic that would be relevant to assessing the growth and opportunities available to a business. A "Senior Management Team" factor may include attributes such as the strength of the management team, the years of industry experience between the management team, the years of company experience between the management team, and any other characteristic that would be relevant in assessing the senior management team of a business. A "Business Systems & Process" factor may include attributes such as the presence of non-compete agreements, the presence of contracts, the presence of confidentiality agreements, and any other characteristic that would be relevant in assessing the system and processes of the business. A "Base Business" factor may include attributes such as potential growth from existing customers, the ability to generate growth from new customers, barriers to entry, and any other characteristic that would be relevant in assessing the base business of the company. A "Financial Performance" factor may include attributes such as revenue trend of the business, cash flow trend of the business, revenue types received by the business, and any other characteristic that would be relevant to assessing the financial performance of the business.

The attribute weights 310 may be based on the relevance or importance of the attribute to the factor. In some embodiments, these attribute weights 310 may be pre-determined. In some embodiments, the individual attribute weights 310 may represent a maximum achievable score of the corresponding attribute. In other embodiments, the attribute weights 310 may be normalized to be values between 0 and 1.

In the context where the user is a business, attribute weights 310 may be dependent (and vary) based on any analysis criteria including, for example, the industry of the business, the size of the business, the geographic aspects of the business, any other characteristic of the business, and so forth. For example, if one of the attributes was the assessed availability of intellectual property (IP) protection, but the business was a commodity business for which IP protection was less relevant, then that attribute would receive less weight.

In some embodiments, there may be a quantitative scale for determining attribute weights 310. For example, for a given factor 304, the attributes may be given importance ratings such as "no relevance", "minor relevance", "neutral", "important", "highest importance", and so forth. These importance ratings may correspond to a quantitative scale (e.g., "highest importance" given X points, "no relevance" given Y points). This quantitative scale may be linear or non-linear. For example, the quantitative scale may be based off the Fibonacci sequence (e.g., 1, 2, 3, 5, 8, 13, 21, and 34) with more important attributes given disproportionately more weight. In another example, the quantitative scale may be based on a 1 to 10 scale (e.g., 1, 2, 3 . . . 10) with a 10 being given ten times more weight than a 1. Any other quantitative scale may be implemented by the system.

There may also be a quantitative scale for assigning quantitative attribute values to attributes having qualitative values. For example, in some cases the attribute values may be obtained from a company questionnaire and the attributes may be assessed qualitatively (e.g., "none", "poor", "neutral", "positive", "excellent", and so forth). There may be a quantitative scale for assigning a quantitative score to the attribute. For example, "excellent" may be X points while "none" may be assigned Y points. This quantitative scale may be linear or non-linear.

In some embodiments, once the attribute value is assigned a qualitative value, it may be normalized to be between 0 and 1 based on the quantitative scale. For example, if "excellent" is the best possible qualitative value then the corresponding quantitative value may be 1. The normalized attribute value may then be multiplied against the maximum achievable value for that attribute (i.e., the attribute weight) in order to rescale the attribute value against the maximum achievable value. For example, if the attribute had a best possible quantitative score that yielded a normalized value of 1, and the maximum achievable value for that attribute was a 50, then the attribute would receive a score of 50 (i.e., 50 times 1).

An alternative way of performing the calculation is from the perspective that the quantified attribute values, once normalized, are the attribute weights 310 with values of 0 to 1, and they are used to weight the maximum achievable values for that attribute category (which are quantified based on the importance of that attribute).

Both the attribute weights 310 and the factor weights 308 may be a varying component of the analysis model and may be associated with the characteristics of the user and/or any analysis criteria. For example, the analysis model and/or the weights may be chosen or pre-determined based on the characteristics of the user as determined through the analysis criteria (e.g., user-provided data, third-party data, and/or other user data). Different values for the attribute weights 310 and factor weights 308 may be stored as part of the relevant analysis models and/or in tables or databases and looked up by the system when needed, described below in reference to FIG. 4.

As a more specific example, if the user were a business then both the attribute weights 310 and the factor weights 308 may be determined based on characteristics of the business (and/or any other analysis criteria), such as the industry the business is in, the size of the business, the geographical location of the business, and so forth. The attribute weights 310 and/or the factor weights 308 for various businesses may be stored as part of analysis models and/or in tables, and they may be referenced by the business characteristics to be looked up when needed. For example, in some embodiments, different business industries may be assigned unique codes and the analysis model or weights may be referenced by a unique industry code. If the analysis model or weights for a business in X industry are desired, then the analysis model or weights may be looked up in the table using the corresponding industry code for X industry (along with any other identifiers of business characteristics). In some of such embodiments, the industry codes used are NAICS codes.

The use of varying attribute weights or factor weights in the analysis models may improve the accuracy of the system. For example, the system can utilize attribute weights or factor weights that best fit a given user, which allows the analysis to be more accurate than it would be with a single set of attribute weights or factor weights. Furthermore, the use of varying attribute weights and factor weights depending on the user data may also improve the efficiency of the system. Instead of a large number of wildly different analysis models created and stored for different types of users, the system may store just the key differences between analysis models for different types of users (e.g., attribute weights, factor weights, attributes, factors). This also allows the analysis models to be easily edited. Instead of having to individually modify hundreds of analysis models, the attribute weights and factor weights can be adjusted instead.

In some embodiments, the user may be able to customize the analysis model and the various aspects of the analysis model, including the customization of specific attributes, factors, weights, and/or the like. For example, the user may be able to select the set of attributes or factors to use, the attribute weights or factor weights, or even how the attribute scores, factor scores, or analysis scores are calculated. In some embodiments, the user may be able to provide these customizations as part of the analysis criteria.

Figure 4:
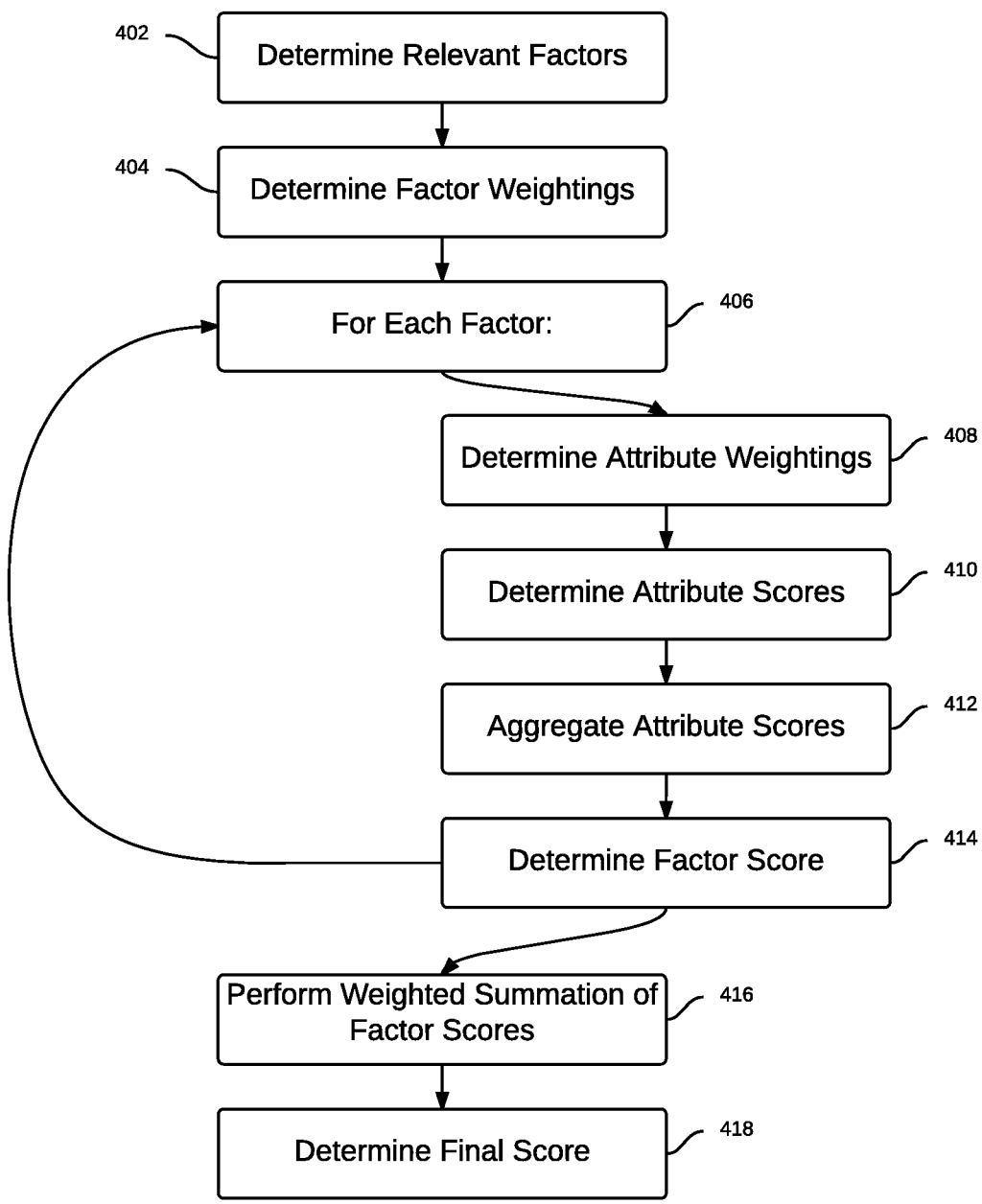
FIG. 4 is a flow chart illustrating an example operation of the system associated with an analysis model, according to embodiments of the present disclosure.

FIG. 4 is a flow chart illustrating an example operation of the system associated with an analysis model, according to embodiments of the present disclosure. However, the example operation shown in FIG. 4 may have features such as those described below in reference to the alternative example provided in FIG. 13. Thus features described in reference to FIG. 4 and FIG. 13 may be used in any combination.

At block 402, the system, by reference to the relevant analysis model, may determine the relevant factors to be used in calculating the final score. In some embodiments, the specific analysis model chosen, and therefore the specific factors to be used, may vary depending on the analysis criteria specified. The factors serve as categories or groupings for the different attributes being assessed.

At block 404, the system may determine the factor weightings for each factor. As previously described, these factor weightings may vary based on the analysis model, the characteristics of the user, and/or any other analysis criteria. The analysis models and/or factor weightings may be stored in various data sources, including a local, remote, or third-party database that the system may access and retrieve.

At block 406, the system may perform a series of calculations for each factor in order to determine its factor score. Thus, for each factor, at block 408, the system may determine attribute weightings for the attributes in that factor.

As also previously described, both the factor weightings and attribute weightings, as associated with the analysis models, may be pre-determined beforehand and stored in a database. For example, if the user is a business the factor weightings and attribute weightings may vary based on characteristics of the business and/or any other analysis criteria. Determination of an analysis model specific to a given user (e.g., a business) may advantageously enable the system of calculate factor scores and a final score that represents accurate assessments of the various aspects of the user. The analysis models and/or attribute weightings may also be stored in various data sources, including a local, remote, or third-party database that the system may access and retrieve.

At block 410, the system may determine the attribute scores or values for each of the attributes in the factor. As described herein, the attribute scores may be determined based on user information as applied to each attribute.

At block 412, the system may aggregate the attribute scores, and at block 414, determine the factor score. In some embodiments, the factor score may be a weighted summation of the attribute scores. However, the attribute scores may be aggregated in any way.

Once the individual factor scores have all been determined, then at block 416, the system may perform a weighted summation of the factor scores using the factor weightings obtained at block 404. At block 418, the system determines a final score, which can be inserted into a report, interactive user interface, and/or any other output to be provided to the user.

In various embodiments, the final score may be normalized to a scale of 500-850, a scale of 1-100, and/or any other suitable scale. For example, the different factor weightings used in calculating the final score may be multiplied by 850 (or any other value) in order to determine the maximum score possible for the respective factor.

FIG. 5 is a block diagram illustrating examples of the various types of data that may be integrated by the system, according to embodiments of the present disclosure. The diagram provides additional insight into block 108 of FIG. 1 by demonstrating examples of the various types of user data and how data sources may be determined.

The figure illustrates three data stores: previously calculated data database 112, third-party data database 114, and user-provided data database 116. User data may be stored in all of these data sources, and all the types of data items in the figure shown may be considered user data. These data sources may be local, remote, or hosted by third-parties. For example, third-party data database 114 may contain user data originating from a third-party, but it could be stored locally or hosted by that third-party.

Previously calculated data database 112 may contain previous attribute weights 310, previous factor weights 308, previous data strength weights 502, previous analysis data 503, transaction multiples 504, NAICS codes 505, and/or other data related to analysis models or analysis of users performed by the system. As previously discussed, the previous attribute weights 310 and previous factor weights 308 may be predetermined on characteristics of the user. Identifiers of those characteristics found in user data may be needed in order to query the appropriate previous attribute weights 310 and/or previous factor weights 308 to be used in the analysis model.

For example, if the user is a business, then previous attribute weights 310, previous factor weights 308, and/or other analysis model related data may be dependent on the analysis criteria, such as the user-provided data associated with characteristics of the business, including the industry the business is in. For example, previous attribute weights 310 and/or previous factor weights 308 may be stored in previously calculated data 112 referenced by industry codes. A subroutine may be used in order to determine the industry code (e.g., NAICS code 505) for a business based on the user-provided user data, which may then be used to lookup the appropriate analysis model (including weights, etc.). In some embodiments, determining the appropriate industry code may involve analyzing user-provided data stored within user-provided data database 116, such as company profile 518 and/or company questionnaire 520.

As previously mentioned, the user may be able to customize various aspects of the analysis model, including, for example, the attributes, factors, attribute weights, factor weights, and/or outputs. In some implementations, the attribute weights and factors weights (along with the attributes or factors themselves) may be entirely dependent on the user's customizations. In some embodiments, the user may be able to select the set of attribute weights and set of factor weights to use from previous attribute weights 310 and previous factor weights 308. For example, the system may provide a user interface to the user that allows the user to browse the various sets of attribute weights available from previous attribute weights 310 and select the set of attribute weights the user wishes to use for the analysis model. In some embodiments, the user may be able to choose the exact values for the attribute weights and factor weights. For example, the user may be able to specify 0.1, 0.2, 0.3, 0.2, and 0.2 as the factor weights to use in the analysis model. Since the user is directly setting these values in this situation, the previous attribute weights 310 and previous factor weights 308 may not be used at all in the analysis model.

In some cases, there may be previous data strength weights 502 that may be applied to adjust the final score (or the analysis model) depending on the credibility of the source of some of the user data used in the analysis. Some user data may be more credible than others. For example, user-provided data that is self-reported or self-calculated by the user may lack objectivity and may be considered less-credible than user data that is somehow verified or obtained from an objective, independent source. Additionally, self-reported user data can be problematic because it is less consistent across users and there is no universal standard or rubric used across users. If less-credible user data is used in the analysis model, then the accuracy of the analysis results may be affected. The previous data strength weights 502 may be pre-determined weights that are applied to the final score in order to compensate for the credibility of the user data. For example, there may be a specific data strength weighting used when the analysis model relies on user data that has been self-reported by the user, and that weighting can be applied to the final score to adjust the final score downwards to compensate for any inflation in the final score due to the user self-reporting. Alternatively, the data strength weighting could be used to adjust the final score upwards if the source of the user data is reliable.

For example, if the user is a business being evaluated then the analysis may depend on user data provided in company questionnaire 520. If company questionnaire 520 is provided by an unknown source or from self-reporting (i.e., the user filled out the company questionnaire 520), those attribute values may not be as accurate as if company questionnaire 520 had been provided through an internal audit or an external audit. Thus, previous data strength weights 502 may have weightings applicable for unknown sources or self-reporting users that can be applied to scale down the final score when the source of the company questionnaire 520 is unreliable in order to counteract the possibility that some of the attribute values are inflated. If the company questionnaire 520 were provided through an audit, then the previous data strength weights 502 may provide a weighting for adjusting the final score upwards.

Previous analysis data 503 may include any data used in a prior analysis for a given user. It may include the analysis results, as well as data used to perform the analysis. It may include user data, such as the attributes, factors, and various weights used in the analysis.

For the evaluation of business-users, the transaction multiples 504 and revenue bands 506 in the previously calculated data database 112 may be useful in providing "value gap" analysis and calculations, or any other output based on a multiple of financial metric. In addition to a general evaluation of the business, a business-user may desire to know the market valuation for the business for various reasons, including the desire to know a reasonable estimate of the business's potential sale value. There are many valuation methods accepted by the financial community, and one frequently used valuation method involves the use of multiples. This method involves determining the values of peer companies in the same industry as the company and calculating the multiple of a specific financial metric, such as possible sale price divided by annual revenue. For example, a company valued at $100 MM with an annual revenue of $20 MM would be considered to have a price/revenue multiple of 5 ($100 MM/$20 MM). Once these multiples are determined for peer companies, a comparable multiple can be used to value the user's business. For example, if the user's business generates $10 MM year in revenue and most companies in the industry are valued at a price/revenue multiple of 5, then the value of the user's business is estimated to be $50 MM.

In practice however, the multiples for peer companies in an industry can vary. With the price/revenue multiple example, company A may have a multiple of 10 while company B has a multiple of 0.5. Thus, the multiples in a given industry can fall into a range of multiples. Different industries will have different multiple ranges. Within a given industry, the multiple range can be further specified by taking into consideration the characteristics of the various companies and filtering based on those characteristics. For example, large companies in a given industry may have a multiple range that is different from the multiple range of small companies in that industry. These multiple ranges may be pre-determined for various industries and other business characteristics (e.g., business size) which are available in the user data, using statistical methods known in the art.

By determining an appropriate multiple range for companies closely related to the business-user, that multiple range can be used to estimate a multiple for the business-user under the assumption that the multiple for the business-user would fall within that multiple range. This estimation can be performed any number of ways. For example, the estimation of the multiple for the business-user can be based on an analysis score (e.g., an output of the analysis model of the system), with higher analysis scores translating into a higher multiple within the multiple range. Alternatively, the estimation of the multiple may be dependent on any business characteristic or set of business characteristics within the user data. Take for example, a multiple range that is based on large companies within the paper industry. Within that multiple range, the different companies may have a multiple that depends on profit margin, such that a company with a higher profit margin has a higher multiple. Since the profit margin is an independent variable of the multiple, the profit margin of the business-user can then be used to provide an estimate of the multiple.

It should also be noted that different underlying financial metrics can be used for the multiple and multiple range. The example above involved a multiple of revenue (sales), but other examples of the multiple may include, for example, a multiple of gross profit; earnings before interest, taxes, depreciation, and amortization (EBITDA); earnings before interest, taxes, and depreciation (EBIT); discretionary earnings, gross profit, and so forth. The multiple range for a group of closely related companies may vary depending on the underlying financial metric used for the multiples.

The underlying financial metric, the appropriate multiple range to use, and the method of estimating the user's multiple from the multiple range may be aspects of the analysis model, and may be determined based on one or more analysis criteria (including one or more user data items). Thus, the system may be configured to determine the correct financial metric on which to base the multiples, an appropriate multiple range to use for valuing the business, and the estimated multiple for the user. The estimated multiple and the multiple range can be used to provide the user an understanding of where in the multiple range the multiple for its business lies. In some embodiments, the estimated multiple may be interpreted under the assumption that better businesses are generally assigned a higher multiple in the multiple range. In some embodiments, the final score may be associated with the estimated multiple and where in the multiple range the estimated multiple lies. For example, a fifty-percentile final score may translate to an estimated multiple that is halfway in the multiple range. However, the relationship between the final score and the estimated multiple does not need to be linear. Any relationship may be used. For example, a ninety-percentile final score may result in an estimate multiple that is halfway in the multiple range, such that extremely high final scores are needed to obtain estimated multiples in the upper portion of the multiple range.

The system may make these determinations in various ways. As shown in FIG. 5, transaction multiples 504 represents multiple ranges associated with sets of various companies. For example, the multiple range for revenue based on large paper companies may be contained within transaction multiples 504. Transaction multiples 504 may be available and stored within previously calculated data database 112. Alternatively, the transaction multiples 504 may be stored in third-party data database 114. The data sources may be external or internal. For example, the transaction multiples 504 may be obtained from a third-party data source that specializes in determining the multiple ranges of various industries. Alternatively, the transaction multiples 504 may be proprietary and stored internally. It should be noted that there may be multiple types of multiple ranges within transaction multiples 504 that are retrievable for a user. For example, there may be multiple ranges based on sales; gross profit; earnings before interest, taxes, depreciation, and amortization (EBITDA); earnings before interest, taxes, and depreciation (EBIT); discretionary earnings, gross profit, and so forth—these are just a handful of metrics that can be used to value a business.

The system may be configured to retrieve one, or all, of the available types of transaction multiples 504 relevant to a user. Since the transaction multiples 504 may be dependent on various business characteristics available in the user data, retrieving the appropriate or relevant multiples may first require a determination of those various business characteristics from the user data. For example, the appropriate multiples for a user in transaction multiples 504 may depend on the industry of the business-user and/or the size of the business. Those can be determined through the user data and used to look up the appropriate multiples within transaction multiples 504.

As shown in FIG. 5, the transaction multiples 504 may be dependent on the business industry and/or revenue bands 506. More specifically, the transaction multiples 504 may be dependent on business industry and/or the size of the user's business, and revenue bands 506 may be used as a proxy in determining the size of the user's business. Revenue bands 506 may be a set of ranges of revenue within a specific industry that can be used to classify the size of a user's business. For example, there may be a set of revenue bands within the paper industry that classifies companies with over $2B in revenue as large, companies with $1-2B in revenue as medium, and companies with under $1B in revenue as small. Different multiple ranges may exist for large, medium, and small companies in the paper industry. If the user's business is a $3B revenue paper company, the revenue bands could be used to classify the user's business as a large company in order to retrieve the multiple ranges for large paper companies.

The transaction multiples 504 and/or revenue bands 506 may be looked up based on any business characteristic available in the user data. However, as shown in this example, the revenue bands 506 are dependent on the business industry of the user. Revenue bands 506 are stored in third-party data database 114. The system may determine the industry of the user through the user-provided data in the analysis criteria, and use that industry to look up the appropriate revenue bands 506. In some embodiments, the industry of the user is referenced using industry codes, like NAICs codes 505. The system may be configured to determine the appropriate industry code from the user-provided data and use the information to lookup the appropriate revenue bands.

Thus, if the level of analysis and the analysis model chosen involves transaction multiples 504 and revenue bands 506, the system may automatically determine the NAICS code 505 from the user-provided data and the appropriate revenue bands 506. The revenue bands 506 and the NAICS code 505 can then be used to retrieve the appropriate transaction multiples 504. In an implementation, if no revenue bands 506 are available for the user, then the transaction multiple 504 may be looked up solely based on the NAICS code 505. In some embodiments, the maximum multiple in the multiple ranges for transaction multiples 504 may be referenced only by NAICS code 505, while the minimum multiple in the multiple ranges may be referenced by NAICS code 505 and/or revenue bands 506.

In some embodiments, the user may be able to customize these aspects of the analysis model, such as through the analysis criteria. The user may be able to customize the underlying financial metric for the multiples, the multiple range, the revenue bands, and so forth. For example, the user may choose for a EBITDA-based multiple to be used and provide that in the analysis criteria. That selection will change the analysis model in order to provide an estimated EBITDA multiple and an EBITDA multiple range, which is looked up from transaction multiples 504.

While many of the valuation examples described above are provided in terms of a business-user for convenience, similar implementations and methods may be applied to any user of the system (e.g., persons, services, legal instruments, etc.), as described herein.

Another data store may be third-party data database 114, which may include user data such as revenue bands 506 (if available), and attribute values 508. Attribute values 508 may be obtained from any kind of user data, and they can be used in the analysis model. Some of this user data may also be obtained from user-provided data database 116.

For business-users, the attribute values 508 may be determined using financial data 510, customer data 512, management data 514, and so forth. Third-party data database 114 may also contain information regarding the revenues of different companies, including the business for which evaluation is being sought. Revenue bands 506 are also most-applicable to business-users. A subroutine may query the third-party data database 114 in order to retrieve revenue bands 506, which may vary depending on any user data or analysis criteria, including the size of the business and any other relevant business characteristics. For example, the revenue bands 506 may be derived from the size of the business (e.g., small, medium, large) classified based on revenue. Alternatively, this information may be found through company profile 518 or company questionnaire 520. Once the revenue for the business is determined, it can be used to look up the appropriate revenue bands 506 in third-party data database 114. Revenue bands 506 may then be used (with the NAICS code 505) in order to retrieve the transaction multiple 504 as previously described. If instead, the business size cannot be identified for some reason and no revenue bands 506 are retrieved, then the transaction multiple 504 may be based solely on the NAICS code 505.

Another data source may be user-provided data database 116, which may include attribute values 516. User-provided data database 116 may contain user data that has been directly provided by the user. Attribute values 516 may be obtained from any kind of user data, and they can be used in the analysis model. User-provided data database 116 may be an internal or external data source, and may comprise multiple data sources. As an example of user-provided data in an internal data source, the user may submit user-provided data to the system (e.g., as part of the analysis criteria) and the system may store that user-provided data internally in an internal data source for use. In some embodiments, the user may submit the user-provided data by providing a spreadsheet which is then analyzed to extract relevant user data in a common format and stored in the internal data source. The user-provided data may also be stored in an external data source, such as if the user stored the user-provided data in an user-provided data database 116 on a server. The system may access that server in order to retrieve the user-provided data. In the case of the user being a company, the system may be configured to automatically access the company's systems or computers in order to retrieve the user-provided data (e.g., plugging into Quickbooks to extract financial data).

For users that are companies, examples of user-provided data containing attribute values 516 may include company profile 518, company questionnaire 520, and so forth. Company questionnaire 520 may be a questionnaire that the business being evaluated (or some related party) has to fill out. In some embodiments, the company questionnaire 520 may have five sections, such as "Financial Performance", "Base Business", "Business Systems & Processes", "Senior Management Team", and "Growth Opportunity Analysis". In other words, the company questionnaire 520 may be broken down into factors (categories/sections) that each has its own attributes (questions). In some embodiments, the company questionnaire 520 is filled out with qualitative answers from a pre-defined set. For example, the company (or other party) may assess their IP portfolio as "neutral" if it is neither a strength nor a weakness. All of these answers may be converted to quantitative attribute values and used to calculate factor scores based on their attribute weights.

VI. Example Reports

Figure 6:
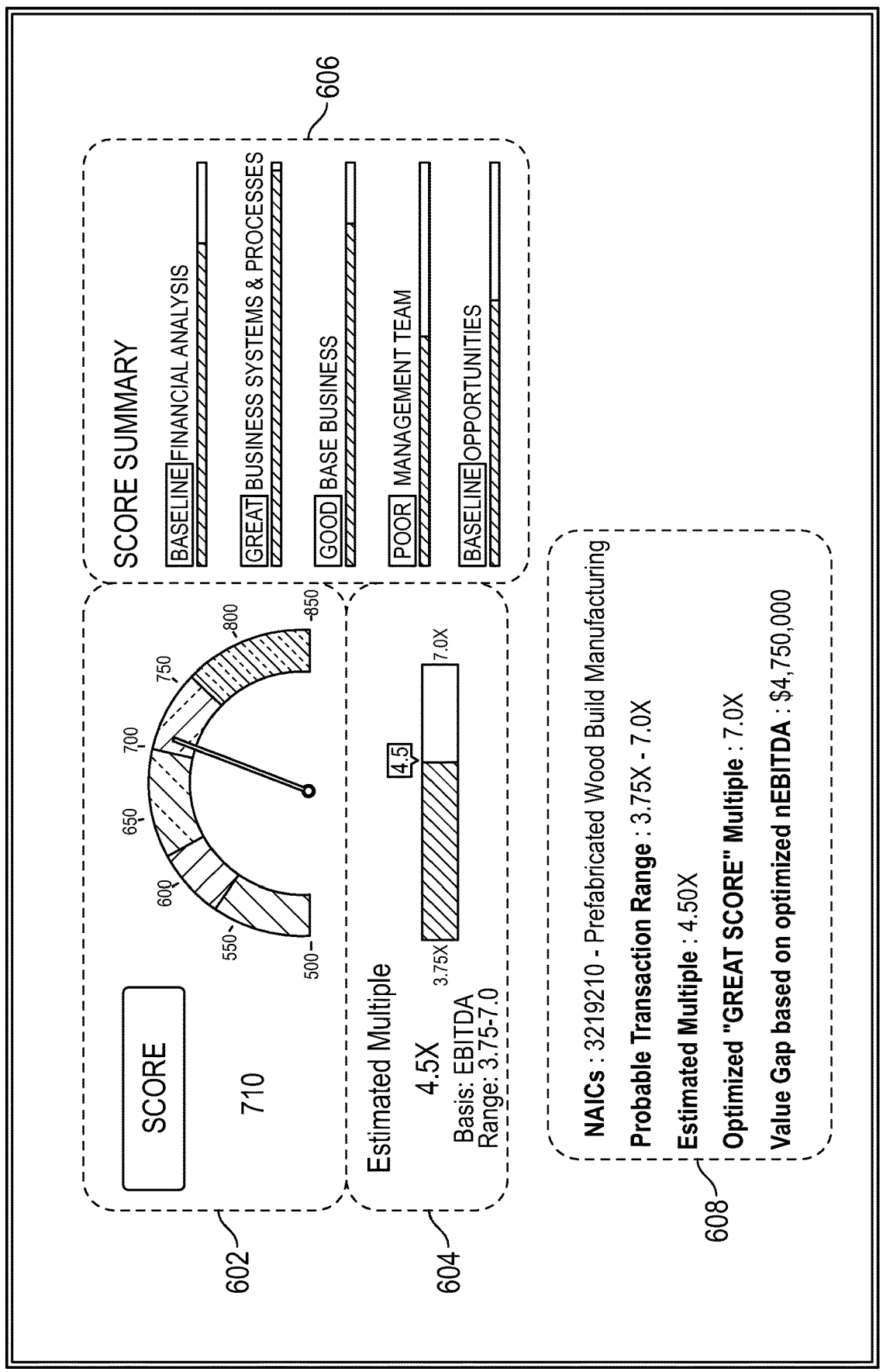
Figure 7:
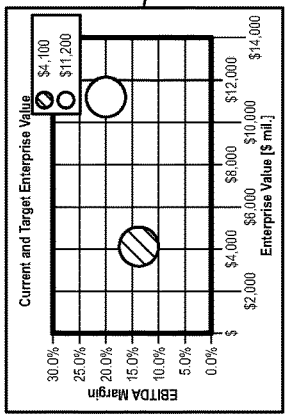

FIGS. 6-8 illustrate example outputs of the system, according to embodiments of the present disclosure. FIG. 6 illustrates examples of information that may be provided to users in reports at various analysis levels. However, the outputs shown in FIG. 6 may have features described in reference to the alternative example provided in FIG. 12. Thus, features described in reference to FIG. 6 and FIG. 12 may be used in any combination.

As previously mentioned, there may be various levels of analysis that the user desires, and the information available in the report may be different depending on the desired level of analysis. In some embodiments, there may be five levels of analysis that increase in level of complexity. Since different users are seeking different objectives from the analysis, having multiple levels of analysis improves the efficiency of the system. Each user may select and receive a level of analysis that fits their own objectives, rather than the system providing a complicated analysis to every user (which may present irrelevant information or details that the user will not care for). For each analysis, the system may collect only the necessary user data to perform that analysis desired by the user. Thus, having multiple analysis levels allows the system to be flexible in determining what user data is collected, how that user data is collected, and the complexity of the analysis model.

At a first level of analysis, the report may include user interface element 602 for the user to view the calculated analysis score. In some embodiments, user interface element 602 may be shaped like a gauge and include a score range that ranges from a minimum possible analysis score to a maximum possible analysis score, although the endpoints of the score range may be anything (including values that the analysis score cannot be). There may be an indicator configured to show where on the overall score range the analysis score lies. There may be colored bands (e.g., red, orange, yellow, light green, dark green, and so forth) used to break up the overall score range into smaller ranges, with each colored band representing a smaller range within the overall score range. These colored bands may be used to provide the user an easily understandable context for their analysis score (e.g., green is good) with just a quick glance at user interface element 602.

At a second level of analysis, the report may additionally include user interface element 604. This example output may be associated with an analysis that utilizes multiple ranges to estimate a user multiple. As previously described in regards to FIG. 5, the system may be configured to determine the multiple range of a financial metric for peer users/companies in the same industry as the business/user, as well as determine an estimated multiple for the business/user. In some cases, these values may come from the system determining the industry of the user and its corresponding NAICS code 505, looking up the revenue bands 506 by the NAICS code, and then looking up the multiple ranges based on the NAICS code 505 and/or revenue bands 506 (which are used to classify the size of the user's business). As shown in the figure, user interface element 604 shows an estimated multiple of 4.5X based on the financial metric of EBITDA. This means that the company value is estimated to be 4.5 times the EBITDA. The user interface element 604 also shows that the multiple range for that industry based on EBITDA is 3.75-7.0.

As shown in the figure, the estimated multiple of the user is determined based on the multiple range and the analysis score. Once the multiple range is determined (e.g., 3.75-7.0 in the example of FIG. 6), the user may be assigned an estimated multiple within that range that is proportional to the analysis score. For example, the possible range for the analysis score may be between 500 and 850. The value of the estimated multiple within the multiple range may be determined based on the value of the analysis score within the possible range for the analysis score, such as through a proportional relationship. For example, if the analysis score is at the halfway point of the analysis score range, then the estimate multiple could be the halfway point within the multiple range. As shown, the score is calculated to be 710 which is approximately two-thirds into the possible score range, which results in an estimated multiple that is also approximately two-thirds into the multiple range. However, the relationship between the score and the estimated multiple does not need to be proportional or linear. Any relationship may be used. For example, a ninety-percentile score (e.g., 800+) may result in an estimated multiple that is halfway in the multiple range, such that extremely high final scores are needed to obtain estimated multiples in the upper portion of the multiple range.

User interface element 604 may include a multiple range bar that shows the entire multiple range and the values of the endpoints. It may also show the estimated multiple for the user and there may be an indicator of where in the multiple range the user's estimated multiple lies. This may provide the user a sense of how their business compares to the range of multiples available in the industry. As shown, a quick glance at the multiple range bar reveals that the 4.5X multiple is approximately two-thirds of the multiple range bar. However, 4.5 is closer nominally to 3.75 (the lower-end of the range) than to 7.0 (the higher-end of the range), which may suggest that a 4.5X multiple is quite respectable and really high scores are needed in order to raise the multiple closer to 7.0X. Thus, in some embodiments, the multiple range bar may display the multiple based on its percentile in the range. The 4.5X multiple may be greater than most companies in the industry, which in this case causes the multiple range bar shown to have two-thirds of the bar filled up despite 4.5X being closer to the lower end of the range (3.75) rather than the higher end of the range (7.0). In some embodiments, the multiple range bar may not be displayed based on the percentile of the multiple in the range. In some of such embodiments, the relationship may be linear and the 4.5X multiple would be reflected in the multiple range bar by having the multiple range bar significantly less full, as 4.5 is much closer to 3.75 than 7.

User interface element 604 may also show the basis or underlying financial metric for the multiple, which as shown is EBITDA. However, the multiple and multiple range may be determined using another financial metric. For example, the multiple could be a multiple of revenue (sales), a multiple of gross profit; a multiple of EBIT, a multiple of discretionary earnings, a multiple of gross profit, and so forth. User interface element 604 may also show the user the "value gap" for the valuation that can be captured from improving their analysis score. For example, the user interface element 604 can be used to see how far away the user's estimated multiple is from the highest possible multiple in the multiple range in order to give a rough sense of how much the estimated multiple could theoretically be increased if the business were to be optimized. More information about this "value gap" may be provided in higher analysis levels and may require additional user data, in the same manner that this second level of analysis may utilize additional user data over the first level of analysis in order to generate user interface element 604.

At a third level of analysis, the report may additionally include user interface element 606 and/or user interface element 608. User interface element 606 may show the breakdown of the final score by category (i.e., the factors used) and show a range of possible factor scores as well as an indication of the factor score within that range. This may be used to visualize how each factor score compared to the maximum available score available for the factor. User interface element 608 may provide further details on the "value gap". In addition to the NAICS code, multiple range, and estimated multiple, user interface element 608 may also provide an optimized "great score" multiple. In some cases, this optimized multiple may be the maximum possible multiple in the multiple range, or it can be the maximum attainable multiple by the user, or close to a maximum attainable multiple by a user. The optimized multiple may reflect how the multiple that may be achieved if the user were to optimize the various attributes and factors used in the analysis model. This optimized multiple may be used in providing an estimate of the dollar impact of the "value gap", which is how much valuation (in terms of the underlying financial metric) may be captured by improving the overall analysis score until the optimized multiple is achieved. Thus, the third level of analysis may utilize additional user data over the first two levels of analysis in order to generate user interface elements 606 and 608.

FIG. 7 illustrates additional examples of information that may be provided to users in reports at various analysis levels.

At a fourth level of analysis, for example, generating a report such as the example report of FIG. 7 may require additional calculations, but not any more data. Instead, the data needed for the third level of analysis may be sufficient.

As shown in FIG. 7, the example report may provide a detailed breakdown of some of the attributes and calculations used in calculating the final score or "value gap". This information can be used to identify how the final score of the business may be improved, and so forth. In other words, the report may serve as a roadmap for improving the business.

Explanation 702 provides an explanation of the various steps of the analysis and how they were performed. This allows the user to obtain a better understanding of the analysis score, any estimated multiples, as well as any other information provided in the report. As shown in the figure, user element 702 discusses how the analysis in this case was performed using EBITDA as the underlying financial metric due to how common it is used by buyers of businesses. This is particularly useful to know for users seeking a valuation in order to sell their business.

Table 704 is a table showing the user's EBITDA for recent years. The table is generated using user data which contains the EBITDA values or data that can be used in order to calculate the EBITDA values.

Table 706 is a table that may show some of the factors and some of the attributes grouped into that factor. For example, the "Growth/Opportunity Analysis" factor is seen in the heading with attributes "Opportunities for growth", "Opportunities for margin improvement", and "Other opportunities" listed in rows underneath. For those attributes, the table also shows an assessment of the current impact of that attribute, comments or details on that attribute, an assessment of that attribute as a key value driver, and the attribute scores and weights assigned to the attribute in the model. For example, for the "Other opportunities" attribute, table 706 shows that attribute as having a maximum possible attribute score of 49. It was assigned a score of 9 (e.g., out of 10), which translates into a weighted score of 44. Across the three attributes in the "Growth/Opportunity Analysis" factor, the maximum possible combined attribute score is 170 of which 147 was actually achieved.

Category weight 708 represents a percentage of the maximum possible combined attribute score that was achieved for a given factor. For example, under "Growth/Opportunity Analysis" 86% of the total possible combined attribute score was realized, whereas 80% was realized for the "Intellectual Property/Legal Analysis" factor.

Graph 710 and Table 712 may provide an estimate of the current valuation of the company's enterprise value based on the current EBITDA level and the estimated EBITDA multiple. A target valuation is also shown in both to provide the user an idea of how much the value of the business can improve if the target is reached. In this case, a 170% increase in value is shown if the user is able to increase profitability and reduce risk.

FIG. 8 illustrates additional examples of information that may be provided to users in reports at various analysis levels.

At a fifth level of analysis, for example, generating a report such as the example report of FIG. 8 may require even further calculations, but still not any additional data. Instead, the data needed for the third level of analysis may be sufficient.

As shown in FIG. 8, the example report may provide an even more detailed breakdown of the attributes and calculations, as in example Table 802. The easiest avenues for improving the final score may also be identified to inform the user how the business may be improved quickly.

Table 802 is a table that shows a factor and some of the attributes within that factor. For example, table 802 shows the factor "financial performance analysis" and underlying attributes, such as "reliable financial reports" or "metrics based financial management". Column 804 shows the maximum possible score of each attribute, and at the bottom is the total possible combined score of all the attributes. Column 806 shows the score for each attribute. For example, "reliable financial reports" scored a 5 (e.g., out of 10). Column 808 shows the weighted score for each attribute and at the bottom is the combined weighted scores for the attributes.

Column 810 and Column 812 reflect scores associated with the attribute if the certain improvements are made to the business. Column 810 shows the updated scores for the various attributes. For example, "reliable financial reports" now is scored with a 9 instead of a 5. Column 812 shows the updated weighted scores for each attribute and at the bottom is the updated combined weighted scores for all the attributes. Column 814 shows the change in the weighted attribute scores for each attribute once the improvements are made, and at the bottom is the total change in the combined weighted scores for the attributes due to the improvements. For example, implementing the improvements is shown as creating an increase of 77 to the combined weighted scores for the attributes.

In an implementation, the report or other output at each analysis level includes all information provided at any lower analysis level.

To reiterate, the systems and methods described herein provide significant technical improvements and inventive concepts. For example, the system may be more flexible and efficient by the use of multiple analysis levels and the storing of data associated with previous analysis for a user, both of which reduce the need for irrelevant or redundant user data/calculations. Multiple analysis levels insures that user data is only collected and analyzed that is relevant to the user's objectives, while the storing of data from a previous analysis insures that user data is not redundantly collected and analyzed in a future analysis. The system may also be more flexible and efficient through the use of varying attributes, factors, and weights. Instead of the system having to rely on hundreds of wildly-different analysis models, the system may instead store, utilize, and focus on the key-differences between analysis models applicable to different users. Furthermore, the system focuses on the exact user data needed for each analysis level, set of analysis criteria, and analysis model before the analysis is performed. The types of user data needed is known before hand for each analysis performed, which allows the use of common sub-routines that are efficiently tailored for retrieving a specific type of user data from a specific data source. This reduces the time needed to retrieve all the necessary data.

The system allows for reports to be generated quickly based off the analysis, which provides substantial practical benefits. For instance, if the user is a business, the user may want to use the contents of the reports to make changes in the business to improve the value of the business. The report and the analysis allow the user to evaluate the value of the business, as well as evaluate the different aspects of the business from which that value is determined. The report and the analysis also allow the user to evaluate how the different aspects of the business can be differentially improved, which allows the user to determine how-best to allocate resources and capital towards improving the value of the business. For example, the report and the analysis may suggest to the user that there a couple of aspects of the business which are quite lacking and their modest improvement would be reflected in a greatly improved valuation of the overall business. The user could allocate resources towards improving those identified aspects of the business, which would improve the business in a more efficient manner than if the user had allocated those resources towards other aspects of the business.

This role of evaluating the aspects of a business, the value of the business, and the changes that can be made to the business is often performed by consultants. However, hiring a consultant can cost a large sum of money and it may take the consultant a long time to fully evaluate the company. It may also not be practical to have a consultant do this on a recurring basis, and it will often be a one-time ordeal. Furthermore, their evaluation can be rather subjective and prone to biases. In comparison, the system allows the same evaluations and conclusions to be obtained in real-time. Businesses can quickly make improvements based on the reports and the analysis of the system, and the businesses can continually request reports and analysis from the system over time as they implement any changes. Thus, businesses can use the system to more quickly identify weaknesses, make improvements, observe the impact of those improvements, and improve the valuation of the business.

VII. Score Simulator

Figure 9:
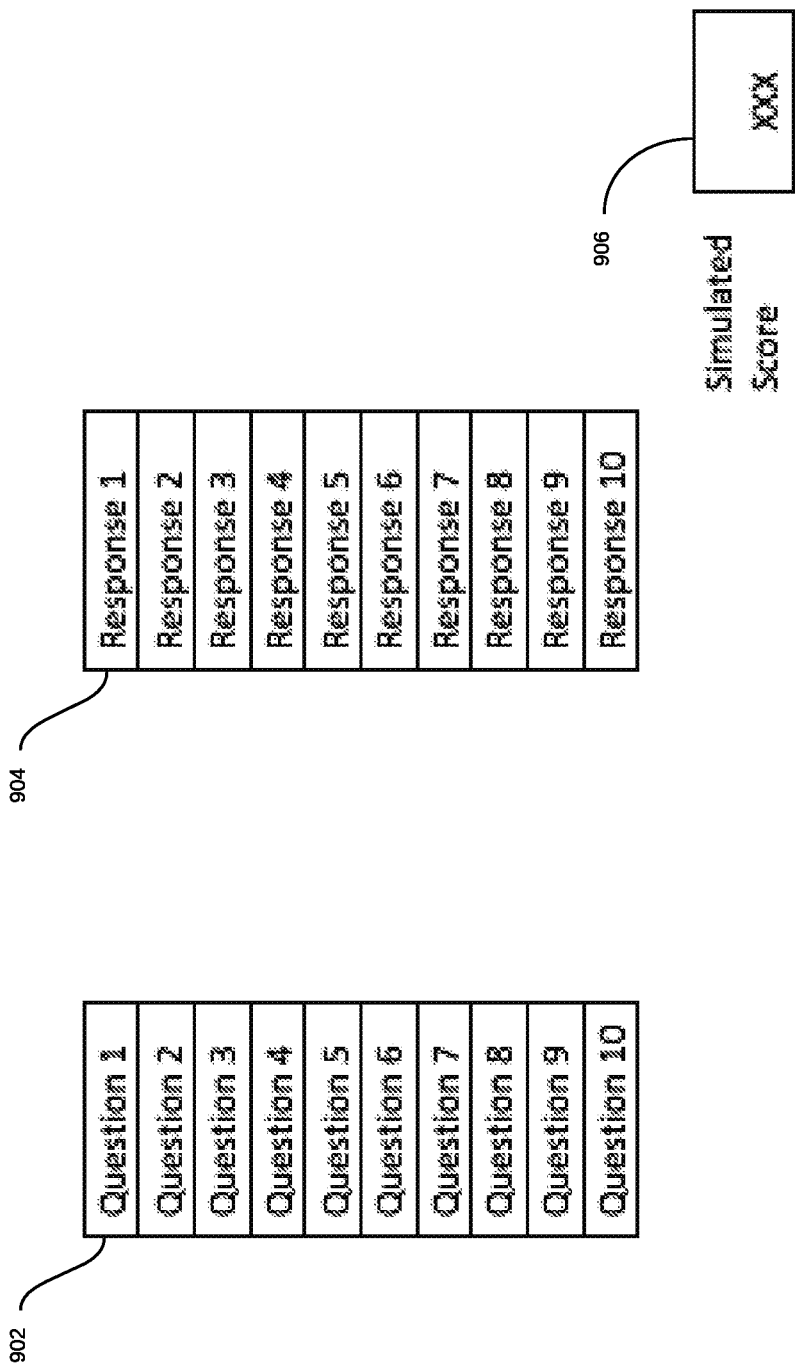
FIGS. 9 and 10 illustrate example outputs of the system, according to embodiments of the present disclosure.
Figure 10:
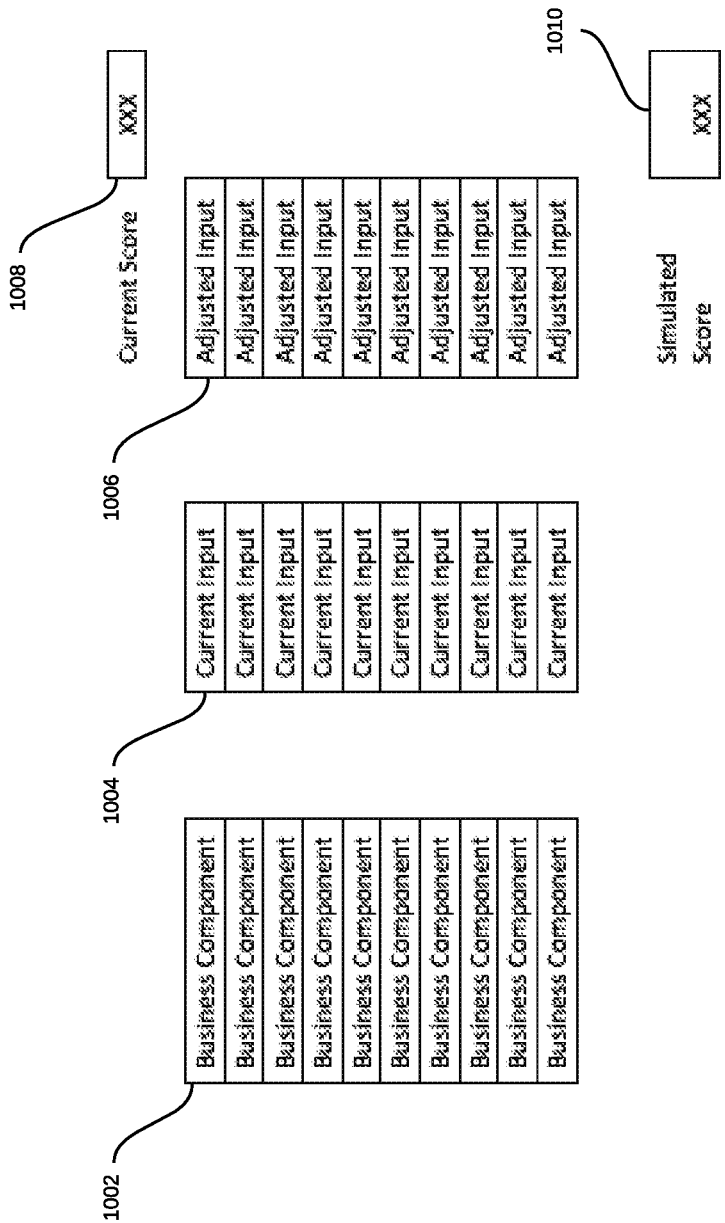

FIGS. 9 and 10 illustrate example outputs of the system, according to embodiments of the present disclosure. More specifically, they illustrate interactive reports or user interfaces that simulate the total score based on varying attribute values. For example, a user may be able to arbitrarily set attribute values and the system may use those attribute values, rather than user data obtained from other sources, in order to calculate the total score. There may be multiple ways for this to be implemented, and FIGS. 9 and 10 only provide a couple non-limiting examples for how the score simulator features may be implemented. Generally, the score simulator allows a user to obtain a better understanding of how changing certain inputs to the analysis model, while holding other inputs constant, will change the calculated total score.

FIG. 9 illustrates an example user interface that may be presented to a user when there has not been an analysis request and a report has not yet been generated. Thus, a total score has not yet been calculated based off actual user data. For example, there may be a website or interface associated with the system that a new or prospective user accesses, and the score simulator feature may be used to demonstrate to that user how the scoring process works. The user may then arbitrarily set any attribute values or provide fictional user data to see a simulated score based off of that information. Other aspects of a typical report may not be provided, since the score was simulated using fictional user data and higher levels of analysis would not be needed. As a more specific example, the user may be a business that accesses the system and explores the score simulator feature to see how the calculated score changes when certain inputs to the analysis model are changed. Based on this evaluation, the business may decide to submit an analysis request so that an actual analysis can be performed using actual user data.

As shown in the figure, the user may be shown a list of questions 902 and a corresponding list of responses 904 that can be entered by the user. Some of the responses 904 may involve the user entering information into a text field, or there may be a menu (e.g., a drop-down menu) of available responses to choose from. The questions 902 may be directed to uncovering specific information about the user that can be used to generate attribute values. For example, if the user is a business, one of the questions 902 may ask for an assessment of near-term growth prospects. The corresponding response to that question in responses 904 may be used in determining one or more attribute values. In this case, the response could be applicable to multiple attributes that involve some aspect of near-term growth, such as future profitability, earnings sustainability, and so forth. The responses 904 entered by the user may be qualitative (e.g., a descriptive word such as "great") or quantitative (e.g., $1 million in revenues last year). Furthermore, the responses 904 may be open-ended (where the user may enter any response, such as $1 million for revenue), range-bound (where the user has to provide a response within a range, such as a number between 1 to 10), or selected from a fixed number of options (where the user must provide one of the options as the response). The system may be configured to use one or more scales to convert the responses 904 to quantitative attribute values that can be used in calculating the simulated score 906, which is presented to the user. In some embodiments, changing one of the responses 904 may change the simulated score 906, as the system may dynamically calculate the simulated score 906 every time a response is changed.

FIG. 10 illustrates an example user interface that may be presented to a user when the user has already been scored. In other words, an analysis has been performed for the user using actual user data. The score simulator feature may allow the user to test out how adjusting certain inputs (e.g., attributes or factors) would affect the calculated score, while other inputs are held constant. As a more specific example, the user may be a business that requested an analysis and received a total score of 700. The business would like to bring their score up to 750 in a near-future analysis, but it may be impractical for the business to make meaningful improvements to every single input in the analysis. Instead, the business may be constrained by resources or time and may only be able to make meaningful improvements to a handful of inputs used in the analysis. In this instance, the score simulator allows the business to evaluate how changing certain inputs to the analysis model, while holding other inputs constant, will change the calculated total score. In this context of business user, this is especially useful since the user can identify potential inputs for improvement that, when changed, produce the greatest change in the simulated score. Based on the how practical or feasible it would be for the business to improve those potential inputs, the business may further narrow the potential inputs for improvement down to 2 or 3 to focus on. Thus, the score simulator allows the business to determine which aspects of the business to commit resources to and make better decisions in deploying capital or efforts.

As shown in the figure, the user may be shown a list of business components 1002 and a corresponding list of the current inputs 10004 for those business components 1002. The business components 1002 may include the various attributes, factors, and so forth, which are used in the analysis model. The current inputs 1004 may be a value associated with the corresponding business components 1002, attributes, or factors (e.g., current inputs 1004 may be an attribute value or an attribute score). The current inputs 1004 may be qualitative (e.g., a descriptive word such as "great") or quantitative (e.g., 7 on a scale of 1 to 10). The current score 1008 is also displayed to the user, which was calculated using the analysis model using at least some of the current inputs 1004. Additionally, there is a list of adjusted inputs 1006 that allow a user to provide new values for the corresponding current inputs 1004 for calculating simulated score 1010, which is shown to the user. The user may not need to provide values for all of the adjusted inputs 1006, only the ones that the user would like to change. In some embodiments, if a certain adjusted input is not provided (i.e., there is no change in that input) the system may calculate the simulated score 1010 using the corresponding current input. The adjusted inputs 1006 provided by the user may be open-ended (e.g., where the user enters a number), range-bound (where the user has to provide a response within a range, such as a number between 1 to 10), or selected from a fixed number of options (e.g., through a drop-down menu). For example, clicking on a certain adjusted input may open up a drop-down menu that shows all the possible values for that input. As the user adjusts the various drop-down menus for the adjusted inputs 1006, the simulated score 1010 would also be adjusted. In some embodiments, changing one of the adjusted inputs 1006 may change the simulated score 1010, as the system may dynamically calculate and update the simulated score 1010 every time one of the adjusted inputs 1006 is changed.

VIII. Alternative Example Operation

Figure 11:
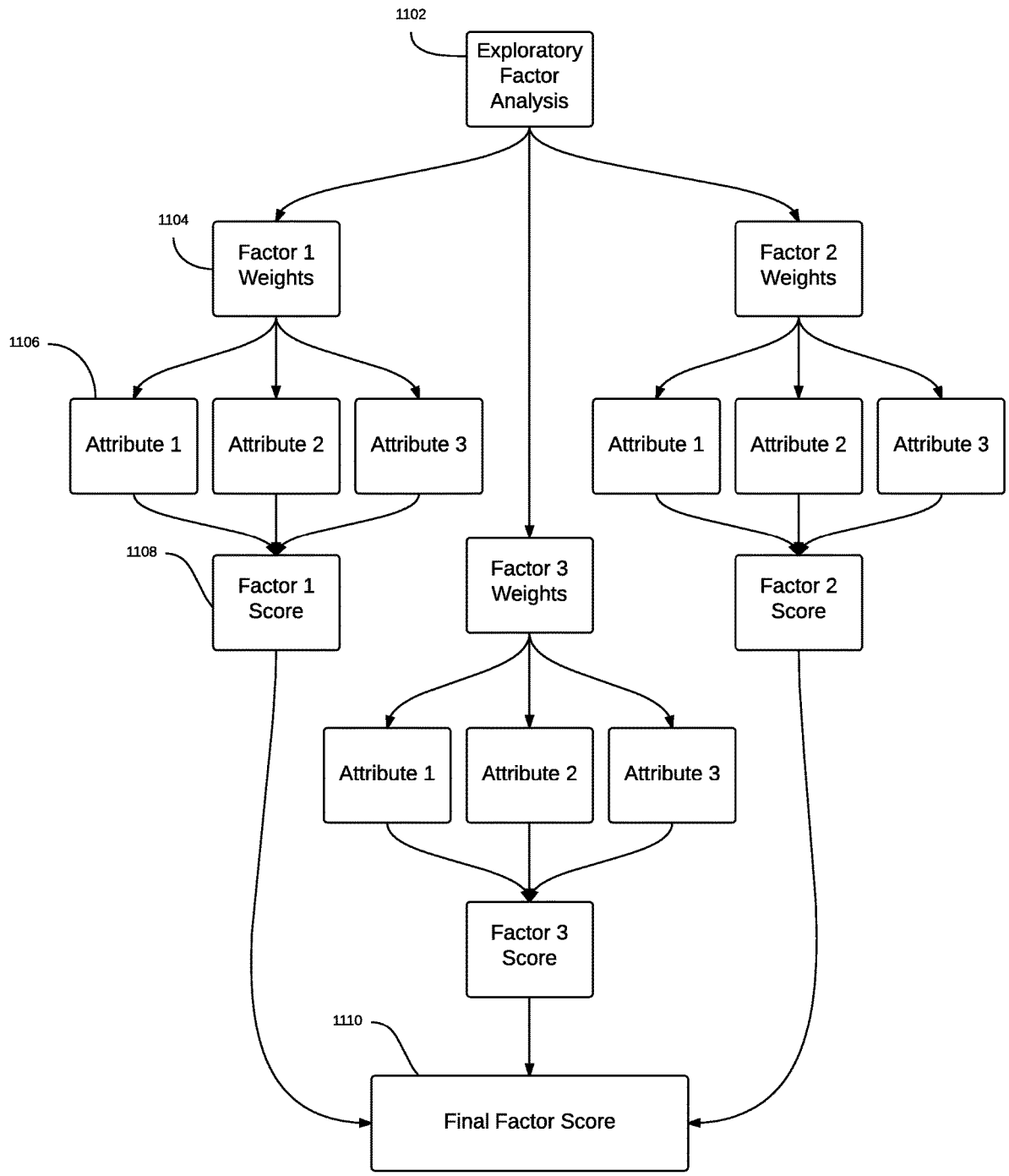
FIG. 11 is a diagram illustrating example aspects of an analysis model, according to embodiments of the present disclosure.
Figure 12:
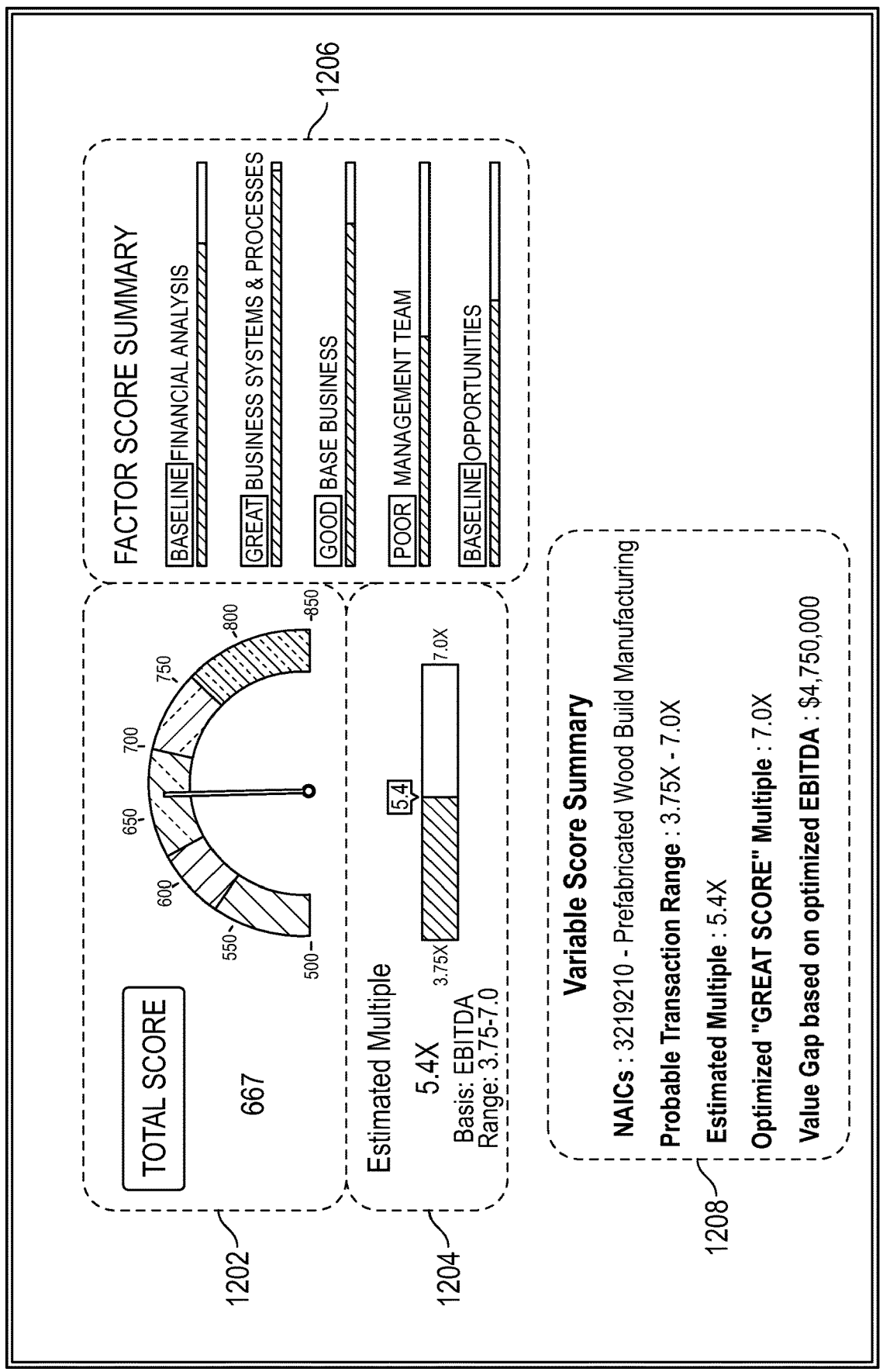
FIG. 12 illustrates an example output of the system, according to embodiments of the present disclosure.
Figure 13:
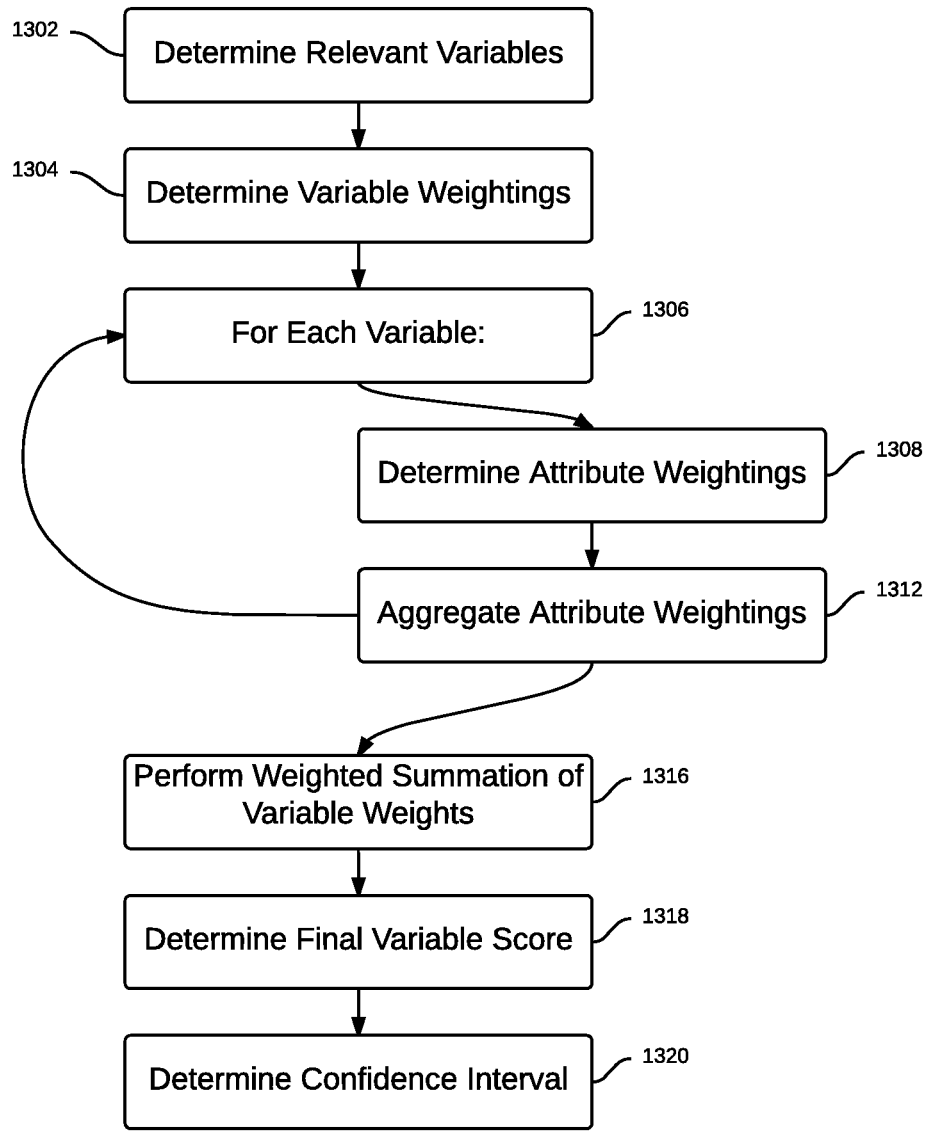
FIG. 13 is a flow chart illustrating an example operation of the system associated with an analysis model, according to embodiments of the present disclosure.

FIGS. 11-13 illustrate example operations and outputs of the system associated with an analysis model, according to embodiments of the present disclosure. More specifically, these figures depict alternative operations and outputs for the system. Any of the individual features shown or described in regards to FIGS. 11-13 may be used in combination with, or in place of, any of the features of the system previously described.

FIG. 11 is a diagram illustrating example aspects of an analysis model, according to embodiments of the present disclosure. It is similar to the analysis model depicted in FIG. 3, and thus aspects of FIG. 11 may be used with, or in place of, any of the features described in regards to FIG. 3.

The system may determine the final score in the analysis model using a variety of methods. For example, it could be performed using regression, or it may be performed using factor analysis, which is a statistical method used to describe variability among observed, correlated variables in terms of a number of unobserved variables called factors. In the context of a business user being evaluated, the valuation of businesses (as a multiple) within a given industry may be correlated to the size of the businesses and the final metric used for the multiple. However, there may be a number of unobserved variables useful in the determination of valuation which can be determined through factor analysis. As shown in the figure, the system performs an exploratory factor analysis 1102 in order to calculate the final score in the analysis model.

A number of factor weights 1104 are obtained for each factor, which include factor 1 weights, factor 2 weights, and factor 3 weights in the figure shown. Those factor weights 1104 are combined with a number of attributes 1106 to calculate a number of factor scores 1108. In the figure, the attributes 1106 include attribute 1, attribute 2, and attribute 3, and the factor scores 1108 include factor 1 score, factor 2 score, and factor 3 score. The three factor scores 1108 are combined to determine a final factor score 1110. Thus, the individual analysis weights are combined into final factor score 1110, which represents the overall individual business characteristics and how they fit into a general pattern of characteristics representing businesses in the sample from the population of all businesses.

FIG. 12 illustrates an example output of the system, according to embodiments of the present disclosure. It is similar to the example output depicted in FIG. 6, and thus aspects of FIG. 12 may be used with, or in place of, any of the features described in regards to FIG. 6.

As previously mentioned, there may be various levels of analysis that the user desires, and the information available in the report may be different depending on the desired level of analysis. In some embodiments, there may be five levels of analysis that increase in level of complexity. Since different users are seeking different objectives from the analysis, having multiple levels of analysis improves the efficiency of the system. Each user may select and receive a level of analysis that fits their own objectives, rather than the system providing a complicated analysis to every user (which may present irrelevant information or details that the user will not care for). For each analysis, the system may collect only the necessary user data to perform that analysis desired by the user. Thus, having multiple analysis levels allows the system to be flexible in determining what user data is collected, how that user data is collected, and the complexity of the analysis model.

At a first level of analysis, the report may include user interface element 1202 for the user to view the calculated analysis total score. In some embodiments, user interface element 1202 may be shaped like a gauge and include a score range that ranges from a minimum possible analysis score to a maximum possible analysis score, although the endpoints of the score range may be anything (including values that the analysis score cannot be). There may be an indicator configured to show where on the overall score range the analysis score lies. There may be colored bands (e.g., red, orange, yellow, light green, dark green, and so forth) used to break up the overall score range into smaller ranges, with each colored band representing a smaller range within the overall score range. These colored bands may be used to provide the user an easily understandable context for their analysis score (e.g., green is good) with just a quick glance at user interface element 1202. User interface element 1202 shows the Total Score, which is a combination of the Factor Score Summary described in FIG. 4, and the Variable Score Summary, described further in FIG. 13. The Factor Score Summary attributes and the Variable Score Summary attributes are combined together using multiple linear regression to create the Total Score. In the figure shown, the Total Score is 667.

At a second level of analysis, the report may additionally include user interface element 1204. This example output may be associated with an analysis that both a point estimate of the exact value of a business as well as a range in which may include the true value of the business.. This business value may either be a dollar estimate, or more likely, an estimate expressed as a multiple of some aspect of the business, such as EBITDA or revenue. For example, rather than expressing the value of a business in absolute dollar terms, it can be expressed as a multiple of last year's EBITDA for the business. That is, if the business's EBITDA last year was $1.46 million, and the estimated value is expressed as a multiple of EBITDA and that multiple is 5.4, then the current dollar value of the business is $7.9 million. By using the multiple, businesses can be more easily compared across different industries, sizes and geographies, for example. The range of multiple expressed in user interface element 1204 on either side of the point estimate of 5.4 is the lower and upper bound of the confidence interval. The upper bound of this range shows the value of 7.0, the theoretical multiple if all of the business attributes for this observation were perfect or optimal. If that were the case, then the business would be valued at 7.0 times the EBITDA or $10.2 million. If the attributes in the Total Score were the least optimal resulting in a value at the lower bound of the confidence interval, because this business achieved the poorest ratings and had the very lowest financial attribute values, the business would sell for a multiple of EBITDA of 3.75, or $5.45 million. The range between the highest optimal score resulting in a multiple of 7.0 ($10.2 million value) compared to the lowest possible multiple of 3.75 ($5.45 million value) creates a difference in possible business dollar values, the value gap, of $4.75 million.

As previously described in regards to FIG. 5, the system may be configured, or rescaled, to determine the multiple range of a financial metric for peer users/companies in the same industry as the business/user, as well as determine an estimated multiple for the business/user. In some cases, these values may come from the system determining the industry of the user and its corresponding NAICS code 505, looking up the revenue bands 506 by the NAICS code, and then looking up the multiple ranges based on the NAICS code 505 and/or revenue bands 506 (which are used to classify the size of the user's business). As shown in the figure, user interface element 1204 shows an estimate multiple of 5.4X based on the financial metric of EBITDA. This means that the company value is estimated to be 5.4 times the EBITDA. The user interface element 1204 also shows that the multiple range for that industry based on EBITDA is 3.75-7.0.

As shown in the figure, the estimated multiple of the user is determined based on the multiple range and the analysis score. Once the multiple range is determined (e.g., 3.75-7.0 in the example of FIG. 12), the user may be assigned an estimated multiple within that range that is proportional to the analysis score. For example, the possible range for the analysis score may be between 550 and 800. The value of the estimated multiple within the multiple range may be determined based on the value of the analysis score within the possible range for the analysis score, such as through a proportional relationship. For example, if the analysis score is at the halfway point of the analysis score range, then the estimate multiple could be the halfway point within the multiple range.

User interface element 1204 may be a multiple range bar that shows the entire multiple range and the values of the endpoints. It may also show the estimated multiple for the user and there may be an indicator of where in the multiple range the user's estimated multiple lies. This may provide the user a sense of how their business compares to the range of multiples available in the industry. User interface element 1204 may also show the user the "value gap" for the valuation that can be captured from improving their analysis score. For example, the user interface element 1204 can be used to see how far away the user's estimated multiple is from the highest possible multiple in the multiple range in order to give a rough sense of how much the estimated multiple could theoretically be increased if the business were to be optimized. More information about this "value gap" may be provided in higher analysis levels and may require additional user data, in the same manner that this second level of analysis may utilize additional user data over the first level of analysis in order to generate user interface element 1204.

At a third level of analysis, the report may additionally include user interface element 1206 and/or user interface element 1208. User interface element 1206 may show the Factor Score Summary, which is a breakdown of the final score by category (i.e., the factors used) and show a range of possible factor scores as well as an indication of the factor score within that range. This may be used to visualize how each factor score compared to the maximum available score available for the factor. User interface element 1208 may provide the Variable Score Summary, which provides the NAICS code, multiple range, estimated multiple, an optimized "great score" multiple, and further details on the "value gap". In some cases, this optimized "great score" multiple may be the maximum possible multiple in the multiple range, or it can be the maximum attainable multiple by the user, or close to a maximum attainable multiple by a user. The optimized multiple may reflect how the multiple that may be achieved if the user were to optimize the various attributes and factors used in the analysis model. This optimized multiple may be used in providing an estimate of the dollar impact of the "value gap", which is how much valuation (in terms of the underlying financial metric) may be captured by improving the overall analysis score until the optimized multiple is achieved. Thus, the third level of analysis may utilize additional user data over the first two levels of analysis in order to generate user interface elements 1206 and 1208.

FIG. 13 is a flow chart illustrating an example operation of the system associated with an analysis model, according to embodiments of the present disclosure. It is similar to the example output depicted in FIG. 4, and thus aspects of FIG. 13 may be used with, or in place of, any of the features described in regards to FIG. 4.

At block 1302, the system, by reference to the relevant analysis model, may determine the relevant variables to be used in calculating the final regression score. In some embodiments, the specific analysis model chosen, and therefore the specific variable to be used, may vary depending on the analysis criteria specified. The variables represent individual business characteristics such as gross profit, revenue, debt, etc. as the different attributes being assessed.

At block 1304, the system may determine the weightings for each variable. These variable weightings may vary based on the analysis model, the characteristics of the user, and/or any other analysis criteria. The analysis models and/or variable weightings may be stored in various data sources, including a local, remote, or third-party database that the system may access and retrieve.

At block 1306, the system may perform a series of calculations for each group of variables in order to determine its total regression score. Thus, for each variable, at block 1308, the system may determine attribute weightings for each variable.

The variable weightings, as associated with the analysis models, may be pre-determined beforehand and stored in a database. For example, if the user is a business the variable weightings may vary based on characteristics of the business and/or any other analysis criteria. Determination of an analysis model specific to a given user (e.g., a business) may advantageously enable the system of calculate a final score that represents accurate assessments of the various aspects of the user. The analysis models and/or variable weightings may also be stored in various data sources, including a local, remote, or third-party database that the system may access and retrieve.

At block 1312, the system may aggregate the attribute weights. Once the individual attribute weights have all been determined for the variable, then at block 1316, the system may perform a weighted summation of the variable weights using the individual attribute weightings obtained at block 1308. At block 1318, the system determines a final variable score, which can be inserted into a report, interactive user interface, and/or any other output to be provided to the user.

In various embodiments, the final score may be normalized to a scale of 500-850, a scale of 1-100, and/or any other suitable scale. For example, the different factor weightings used in calculating the final score may be multiplied by 850 (or any other value) in order to determine the maximum score possible for the respective factor.

At block 1320, the system also determines a range of possible values with a lower bound and upper bound which defines the estimate calculated in block 1318. The business value range represents possible values of estimates that may be reasonably expected given the financial characteristics of this particular business. This value range may vary based upon the accuracy and quantity of the data available for a particular business.

IX. Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system for dynamically accessing and integrating data items from one or more data sources or databases, the computing system comprising:
   one or more data stores storing:
      a plurality of analysis models, and
      a plurality of user data items in one or more databases;
   one or more computer processors; and
   a computer readable storage medium storing program instructions configured for execution by the one or more computer processors in order to cause the computing system to:
   receive analysis criteria including a user data item;
   store the first user data item in the one or more databases as one of the plurality of user data items;
   select, from the plurality of analysis models and based on the user data item, an analysis model, wherein:
      the analysis model defines a plurality of factors,
      the analysis model further defines a plurality of attributes, and
      each of the plurality of attributes is associated with at least one of the plurality of factors;
   determine, for each of the plurality of attributes, and based on at least some of the plurality of user data items, an attribute score;
   determine, for each factor of the plurality of factors, and based on the attribute scores of attributes associated with the factor, a factor score;
   combine, as indicated by the analysis model, the factor scores to determine an analysis score;
   determine, based on at least some of the plurality of user data items, an industry;

determine, based on the industry and at least some of the plurality user data items, an industry code;

determine, based on the industry code and at least some of the plurality of user data items, a minimum multiple and a maximum multiple; and determine an estimated multiple, based on the minimum multiple, the maximum multiple, and the analysis score.

2. The computing system of claim 1, wherein the program instructions are further configured for execution by the one or more computer processors in order to cause the computing system to:

receive the analysis criteria further including a first analysis level; and generate, based on the first analysis level, user interface data useable for rendering a user interface including:
the analysis score; and
a score range gauge with a range from a minimum possible analysis score to a maximum possible analysis score, the score range gauge further comprising:
an analysis score indicator configured to show where on the score range gauge the analysis score lies;
a plurality of colored bands, each colored band representing a smaller range within the score range gauge.

3. The computing system of claim 1, wherein the program instructions are further configured for execution by the one or more computer processors in order to cause the computing system to:

receive the analysis criteria further including a second analysis level; and generate, based on the second analysis level, user interface data useable for rendering a user interface including:
the analysis score;
the estimated multiple;
a score range gauge with a range from a minimum possible analysis score to a maximum possible analysis score, the score range gauge further comprising:
an analysis score indicator configured to show where on the score range gauge the analysis score lies; and
a plurality of colored bands, each colored band representing a smaller range within the score range gauge; and
a multiple range bar with a range from the minimum multiple to the maximum multiple, the multiple range bar further comprising:
an estimated multiple indicator configured to show where on the multiple range bar the estimated multiple lies.

4. The computing system of claim 1, wherein each factor score is associated with a minimum factor score and a maximum factor score, wherein the minimum factor score comprises a minimum possible value for the respective factor score, and wherein the maximum factor score comprises a maximum possible value for the respective factor score.

5. The computing system of claim 4, wherein the program instructions are further configured for execution by the one or more computer processors in order to cause the computing system to:

receive the analysis criteria further including a second analysis level; and generate, based on the second analysis level, user interface data useable for rendering a user interface including:
the analysis score;
a score range gauge with a range from a minimum possible analysis score to a maximum possible analysis score, the score range gauge further comprising:
an analysis score indicator configured to show where on the score range gauge the analysis score lies; and
a plurality of colored bands, each colored band representing a smaller range within the score range gauge; and
a plurality of factor range bars, each factor range bar associated with a factor score and ranging from the minimum factor score to the maximum factor score associated with the respective factor score, each factor range bar further comprising:
an factor score indicator configured to show where on the factor range bar the associated factor score lies.

6. The computing system of claim 1, wherein the program instructions are further configured for execution by the one or more computer processors in order to cause the computing system to:

determine, based on the analysis model, an external data source storing data useable in the analysis model;

receive, from the external data source, another user data item; and store the another user data item in the one or more databases as one of the plurality of user data items.

7. The computing system of claim 1, combining the factor scores to determine an analysis score comprises:

determining, based on at least some of the plurality of user data items, a plurality of factor weights, each factor weight associated with a factor score; and performing a weighted summation of the factor scores with each factor score weighted by its associated factor weight.

8. The computing system of claim 1, determining the attribute score for each of the plurality of attributes comprises:

determining, based on at least some of the plurality of user data items, an attribute value associated with the attribute, the attribute value representing a quantitative value for the attribute;

determining, based on at least some of the plurality of user data items, an attribute weight associated with the attribute, the attribute weight representing a maximum possible attribute score for the attribute; and combining the attribute value with the attribute weight to determine the attribute score.

9. The computing system of claim 1, wherein the program instructions are further configured for execution by the one or more computer processors in order to cause the computing system to:

store the analysis score in the one or more data stores.

10. The computing system of claim 9, wherein the program instructions are further configured for execution by the one or more computer processors in order to cause the computing system to:

receive a second analysis criteria including a second user data item;

determine that a first analysis criteria was received;

determine that the analysis score was stored in the one or more data stores; and retrieve the analysis score from the one or more data stores.

11. A computer-implemented method for dynamically accessing and integrating data items from one or more data sources or databases, the method comprising:
by one or more processors executing program instructions:
communicating with one or more data stores storing:
a plurality of analysis models, and
a plurality of user data items in one or more databases;
receiving analysis criteria including a user data item;
storing the first user data item in the one or more databases as one of the plurality of user data items;
selecting, from the plurality of analysis models and based on the user data item, an analysis model, wherein:
the analysis model defines a plurality of factors,
the analysis model further defines a plurality of attributes, and
each of the plurality of attributes is associated with at least one of the plurality of factors;
determining, for each of the plurality of attributes, and based on at least some of the plurality of user data items, an attribute score;
determining, for each factor of the plurality of factors, and based on the attribute scores of attributes associated with the factor, a factor score;
combining, as indicated by the analysis model, the factor scores to determine an analysis score;
determining, based on at least some of the plurality of user data items, an industry;
determining, based on the industry and at least some of the plurality user data items, an industry code;
determining, based on the industry code and at least some of the plurality of user data items, a minimum multiple and a maximum multiple; and
determining an estimated multiple, based on the minimum multiple, the maximum multiple, and the analysis score.

12. The computer-implemented method of claim 11 further comprising:
by the one or more processors executing program instructions:
receive the analysis criteria further including a first analysis level; and
generate, based on the first analysis level, user interface data useable for rendering a user interface including:
the analysis score; and
a score range gauge with a range from a minimum possible analysis score to a maximum possible analysis score, the score range gauge further comprising:
an analysis score indicator configured to show where on the score range gauge the analysis score lies;
a plurality of colored bands, each colored band representing a smaller range within the score range gauge.

13. The computer-implemented method of claim 11 further comprising:
by the one or more processors executing program instructions:
receive the analysis criteria further including a second analysis level; and
generate, based on the second analysis level, user interface data useable for rendering a user interface including:
the analysis score;
the estimated multiple;
a score range gauge with a range from a minimum possible analysis score to a maximum possible analysis score, the score range gauge further comprising:
an analysis score indicator configured to show where on the score range gauge the analysis score lies; and
a plurality of colored bands, each colored band representing a smaller range within the score range gauge; and
a multiple range bar with a range from the minimum multiple to the maximum multiple, the multiple range bar further comprising:
an estimated multiple indicator configured to show where on the multiple range bar the estimated multiple lies.

14. The computer-implemented method of claim 11, wherein each factor score is associated with a minimum factor score and a maximum factor score, wherein the minimum factor score comprises a minimum possible value for the respective factor score, and wherein the maximum factor score comprises a maximum possible value for the respective factor score.

15. The computer-implemented method of claim 14 further comprising:
by the one or more processors executing program instructions:
receive the analysis criteria further including a second analysis level; and
generate, based on the second analysis level, user interface data useable for rendering a user interface including:
the analysis score;
a score range gauge with a range from a minimum possible analysis score to a maximum possible analysis score, the score range gauge further comprising:
an analysis score indicator configured to show where on the score range gauge the analysis score lies; and
a plurality of colored bands, each colored band representing a smaller range within the score range gauge; and
a plurality of factor range bars, each factor range bar associated with a factor score and ranging from the minimum factor score to the maximum factor score associated with the respective factor score, each factor range bar further comprising:
an factor score indicator configured to show where on the factor range bar the associated factor score lies.

16. The computer-implemented method of claim 11 further comprising:
by the one or more processors executing program instructions:
determine, based on the analysis model, an external data source storing data useable in the analysis model;
receive, from the external data source, another user data item; and
store the another user data item in the one or more databases as one of the plurality of user data items.

17. The computer-implemented method of claim 11, combining the factor scores to determine an analysis score comprises:
- determining, based on at least some of the plurality of user data items, a plurality of factor weights, each factor weight associated with a factor score; and
- performing a weighted summation of the factor scores with each factor score weighted by its associated factor weight.

18. The computer-implemented method of claim 11, determining the attribute score for each of the plurality of attributes comprises:
- determining, based on at least some of the plurality of user data items, an attribute value associated with the attribute, the attribute value representing a quantitative value for the attribute;
- determining, based on at least some of the plurality of user data items, an attribute weight associated with the attribute, the attribute weight representing a maximum possible attribute score for the attribute; and
- combining the attribute value with the attribute weight to determine the attribute score.

19. The computer-implemented method of claim 11 further comprising:
- by the one or more processors executing program instructions:
  - store the analysis score in the one or more data stores.

20. The computer-implemented method of claim 19 further comprising:
- by the one or more processors executing program instructions:
  - receive a second analysis criteria including a second user data item;
  - determine that a first analysis criteria was received;
  - determine that the analysis score was stored in the one or more data stores; and
  - retrieve the analysis score from the one or more data stores.

* * * * *